US012700967B2

(12) United States Patent
Huang et al.

(10) Patent No.: US 12,700,967 B2
(45) Date of Patent: Aug. 4, 2026

(54) POSITIONING REFERENCE SIGNAL PRS ASSOCIATION METHOD AND COMMUNICATION APPARATUS

(71) Applicant: HUAWEI TECHNOLOGIES CO., LTD., Shenzhen (CN)

(72) Inventors: Su Huang, Shanghai (CN); Xin Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 18/189,719

(22) Filed: Mar. 24, 2023

(65) Prior Publication Data

US 2023/0231687 A1  Jul. 20, 2023

Related U.S. Application Data

(63) Continuation of application No. PCT/CN2021/120541, filed on Sep. 26, 2021.

(30) Foreign Application Priority Data

Sep. 28, 2020  (CN) .......................... 202011045801.1

(51) Int. Cl.
*H04L 5/00* (2006.01)
*H04W 24/08* (2009.01)

(52) U.S. Cl.
CPC ........... *H04L 5/0051* (2013.01); *H04W 24/08* (2013.01)

(58) Field of Classification Search
CPC ..... H04L 5/0051; H04L 5/0094; H04L 5/005; H04L 5/0048; H04W 24/08; H04W 24/02;
(Continued)

(56) References Cited

U.S. PATENT DOCUMENTS 9,651,653 B2 * 5/2017 Fischer ............... H04W 64/006
10,111,213 B2 * 10/2018 Lee ........................ H04W 72/21
(Continued)

FOREIGN PATENT DOCUMENTS

CN        105589506 A    5/2016
CN        107409286 A    11/2017

OTHER PUBLICATIONS

3GPP TSG RAN WG1 meeting #82 Beijing, China, R1-154837, Joint TP for a proper reference and enhancements of wideband PRS, Huawei, HiSilicon, Intel, ATandT, Aug. 24-28, 2015, total 5 pages.
(Continued)

*Primary Examiner* — Edan Orgad
(74) *Attorney, Agent, or Firm* — Rimon PC

(57) ABSTRACT

Embodiments of this application disclose a positioning reference signal (PRS) association method and a communication apparatus. In the method, a terminal device receives configuration information sent by a positioning management device, where the configuration information indicates an association relationship between PRSs on at least two frequencies. The terminal device measures the PRSs having the association relationship, where the PRSs having the association relationship share a same antenna port or the PRSs having the association relationship have a phase difference. By implementing embodiments of this application, a large-bandwidth PRS configuration can be implemented.

10 Claims, 10 Drawing Sheets

(58) Field of Classification Search

CPC ....... H04W 64/00; H04W 8/24; H04W 24/10; G01S 5/0036; G01S 5/0205

See application file for complete search history.

(56) References Cited

U.S. PATENT DOCUMENTS

| | | | | |
|---|---|---|---|---|
| 10,218,471 | B1 * | 2/2019 | Kumar | H04L 27/0012 |
| 11,178,551 | B2 * | 11/2021 | Kim | H04W 64/003 |
| 12,113,724 | B2 * | 10/2024 | Qi | H04L 5/0005 |
| 2012/0051445 | A1 * | 3/2012 | Frank | H04L 5/0048 |
| | | | | 375/259 |
| 2012/0165053 | A1 * | 6/2012 | Yoon | H04L 5/0048 |
| | | | | 455/501 |
| 2013/0315168 | A1 * | 11/2013 | Frank | G01S 5/0205 |
| | | | | 370/329 |
| 2015/0382326 | A1 * | 12/2015 | Seo | H04L 5/0053 |
| | | | | 370/329 |
| 2017/0019875 | A1 * | 1/2017 | Fischer | H04B 7/0604 |
| 2017/0215186 | A1 * | 7/2017 | Chen | H04L 5/0048 |
| 2018/0217228 | A1 * | 8/2018 | Edge | H04W 64/00 |
| 2018/0295600 | A1 * | 10/2018 | Kumar | H04L 5/0051 |
| 2018/0317111 | A1 * | 11/2018 | Agnihotri | G01S 5/0252 |
| 2019/0230618 | A1 * | 7/2019 | Saur | H04W 56/001 |
| 2019/0327706 | A1 * | 10/2019 | Agnihotri | H04W 24/10 |
| 2019/0364570 | A1 * | 11/2019 | Kumar | H04W 52/0245 |
| 2019/0372652 | A1 * | 12/2019 | Sadiq | H04B 7/0417 |
| 2019/0372688 | A1 * | 12/2019 | Sadiq | H04B 7/0632 |
| 2019/0373594 | A1 * | 12/2019 | Sadiq | H04W 72/23 |
| 2019/0380054 | A1 * | 12/2019 | Manolakos | H04W 4/023 |
| 2019/0393970 | A1 * | 12/2019 | Kumar | H04W 24/10 |
| 2019/0394747 | A1 * | 12/2019 | Akkarakaran | H04L 5/0007 |
| 2020/0007288 | A1 * | 1/2020 | Manolakos | H04L 5/005 |
| 2020/0014487 | A1 * | 1/2020 | Akkarakaran | H04L 5/0048 |
| 2020/0022167 | A1 * | 1/2020 | Manolakos | H04W 80/10 |
| 2020/0025853 | A1 * | 1/2020 | Sadiq | H04L 27/2613 |
| 2020/0028550 | A1 * | 1/2020 | Manolakos | H04L 5/0051 |
| 2020/0028648 | A1 * | 1/2020 | Akkarakaran | H04W 76/27 |
| 2020/0028768 | A1 * | 1/2020 | Sadiq | H04W 56/0045 |
| 2020/0052845 | A1 * | 2/2020 | Chuang | H04L 5/0048 |
| 2020/0053703 | A1 * | 2/2020 | Akkarakaran | G01S 1/20 |
| 2020/0053719 | A1 * | 2/2020 | Sadiq | H04W 40/04 |
| 2020/0107286 | A1 * | 4/2020 | Akkarakaran | H04W 64/00 |
| 2020/0110151 | A1 * | 4/2020 | Manolakos | G01S 5/10 |
| 2020/0351047 | A1 * | 11/2020 | Akkarakaran | G01S 1/0428 |
| 2021/0112522 | A1 * | 4/2021 | Kim | H04W 64/00 |
| 2021/0185632 | A1 | 6/2021 | Manolakos et al. | |
| 2021/0203460 | A1 * | 7/2021 | Da | H04W 72/0446 |
| 2021/0297965 | A1 * | 9/2021 | Irvine | H04W 56/0055 |
| 2022/0014327 | A1 * | 1/2022 | Yerramalli | H04L 5/0048 |
| 2023/0232405 | A1 * | 7/2023 | Huang | H04L 5/0094 |
| | | | | 370/329 |

OTHER PUBLICATIONS

3GPP TSG-RAN WG2 Meeting #111-e, Online, Aug. 17-28, 2020, R2-2008120, Qualcomm Incorporated, Summary of LPP corrections agenda item 6.6.3; 14 total pages.

3GPP RAN #84 Newport Beach, Jun. 3-6, 2019, RP-190861, Qualcomm, NR Positioning for Rel-17 Qualcomm views; 7 total pages.

3GPP TSG-RAN WG2 #111e, Online, Aug. 17-28, 2020, R2-2006847, Ericsson, Need of reference TRP in the TRP-LocationInfo IE for UE-based assistance data distribution efficiency; 4 total pages.

3GPP TA 38.305 V16.1.0 (Jul. 2020), 3rd Generation Partnership Project; Technical Specification Group Radio Access Network; NG Radio Access Network (NG-RAN); Stage 2 functional specification of User Equipment (UE) positioning in NG-RAN (Release 16); 114 total pages.

Moderator (Intel Corporation) et al: "Feature Lead Summary for NR Positioning Maintenance AI", 3GPP TSG RAN WG1 Meeting #102-E, e-Meeting, Aug. 17-28, 2020, R1-2006996, total 22 pages.

LG Electronics: "Discussions on DL only based Positioning", 3GPP TSG RAN WG1 #96, Athens, Greece, Feb. 25-Mar. 1, 2019, R1-1903346, total 15 pages.

* cited by examiner

POSITIONING REFERENCE SIGNAL PRS ASSOCIATION METHOD AND COMMUNICATION APPARATUS

CROSS-REFERENCE TO RELATED APPLICATIONS

This application is a continuation of International Application No. PCT/CN2021/120541, filed on Sep. 26, 2021, which claims priority to Chinese Patent Application No. 202011045801.1, filed on Sep. 28, 2020. The disclosures of the aforementioned applications are hereby incorporated by reference in their entireties.

TECHNICAL FIELD

This application generally relates to the field of positioning technologies, and in particular, to a positioning reference signal (PRS) association method and a communication apparatus.

BACKGROUND

In a mobile communication system, positioning a terminal device is an important function. Conventional positioning technologies may include a downlink positioning technology and an uplink positioning technology. The downlink positioning technology may be an access network device that sends a downlink reference signal to a terminal device. The downlink reference signal may be a positioning reference signal (PRS). The terminal device measures the downlink reference signal, and sends a measurement result to a positioning management device, so that the positioning management device determines positioning information of the terminal device based on the measurement result.

However, it is found in application that currently, in a low-frequency communication system, positioning precision of the positioning technology is not high. A primary reason may be that a maximum bandwidth of a single PRS in a low-frequency new radio (NR) communication system is 100 MHz, and a precision of a positioning method based on timing ranging may be directly related to the bandwidth. Generally, larger PRS bandwidths indicate higher ranging precision. Therefore, how to enhance an existing PRS configuration structure to implement a large-bandwidth PRS configuration in order to improve positioning precision is a problem that currently needs to be urgently resolved.

SUMMARY

Embodiments of this application provide for a positioning reference signal (PRS) association method and a communication apparatus, to implement large-bandwidth PRS configuration.

According to a first aspect, this application provides a PRS association method. The method includes: a terminal device receives configuration information sent by a positioning management device. The configuration information indicates an association relationship between PRSs on at least two frequencies. The terminal device measures the PRSs having the association relationship. The PRSs having the association relationship share a same antenna port or the PRSs having the association relationship have a phase difference.

In the method described in the first aspect, a network side can configure, for the terminal device, specific PRSs sharing a same antenna port or specific PRSs having a phase difference. A plurality of PRSs share a same antenna port. This indicates that the plurality of PRSs pass through a completely same channel. It can be equivalently considered as that a network device sends a new PRS. Bandwidth of the new PRS is equivalent to a sum of bandwidth of the plurality of PRSs. Therefore, enabling the plurality of PRSs to share a same antenna port can increase signal bandwidth. Therefore, by configuring, for the terminal device, the specific PRSs sharing a same antenna port, large-bandwidth PRS configuration can be implemented. By configuring, for the terminal device, the specific PRSs having a phase difference, the terminal device may estimate the phase difference between these PRSs, and then compensate for a channel phase of the PRS based on the phase difference, so that the plurality of PRSs share a same antenna port, to increase signal bandwidth. Therefore, by configuring, for the terminal device, the specific PRSs having a phase difference, the large-bandwidth PRS configuration can also be implemented.

In a possible implementation, the configuration information further indicates that the PRSs having the association relationship share a same antenna port or the PRSs having the association relationship have a fixed phase difference. Based on this possible implementation, the network side can flexibly configure a type of the association relationship for the terminal device.

In a possible implementation, in a process in which the terminal device measures the PRSs having the association relationship, the phase difference between the PRSs having the association relationship is a fixed value. Optionally, in the process in which the terminal device measures the PRSs having the association relationship, that a change of the phase difference between the PRSs having the association relationship is small, may alternatively be understood as that in the process in which the terminal device measures the PRSs having the association relationship, the phase difference between the PRSs having the association relationship is a fixed value. In the process in which the terminal device measures the PRSs having the association relationship, the phase difference between the PRSs having the association relationship is a fixed value. This helps the terminal device accurately estimate the phase difference between the PRSs having the association relationship.

In a possible implementation, a manner in which the configuration information indicates the association relationship between the PRSs on the at least two frequencies is: the configuration information indicates an association relationship between PRS resources on the at least two frequencies. In other words, the configuration information may indicate the association relationship between the PRSs on the at least two frequencies by indicating the association relationship between the PRS resources on the at least two frequencies. This can accurately and precisely indicate the association relationship between the PRSs on the at least two frequencies. For example, if the configuration information indicates that a PRS resource 1 and a PRS resource 2 have an association relationship, it is equivalent to that of the configuration information indicating that a PRS corresponding to the PRS resource 1 and a PRS corresponding to the PRS resource 2 have the association relationship.

Optionally, the configuration information includes configuration information of a plurality of frequencies, the configuration information of each frequency of the plurality of frequencies includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the configuration information may indicate the association relationship between the PRS resources on the at least two frequencies in the following three specific implementations:

1. Configuration information of a third PRS resource set further includes an index of at least one fourth PRS resource set, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information. Manner 1 can indicate, based on a resource set granularity, the PRS resources having the association relationship, to help reduce signaling overheads.

2. An index of a third PRS resource set and an index of at least one fourth PRS resource set are configured to be the same, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information. Manner 2 can indicate, based on a resource set granularity, the PRS resources having the association relationship, and in Manner 2, additional information does not need to be added to the configuration information to indicate the PRS resources having the association relationship, to help reduce signaling overheads.

3. Configuration information of a third PRS resource further includes at least one piece of second index information, the second index information includes an index of a fourth PRS resource set and an index of a fourth PRS resource in the fourth PRS resource set, to indicate that the third PRS resource and at least one fourth PRS resource have an association relationship, where the third PRS resource and the at least one fourth PRS resource are resources on different frequencies configured in the second configuration information. Manner 3 can indicate, based on a PRS resource granularity, the PRS resources having the association relationship, and indicate an association relationship between PRS resources on different frequencies more precisely.

Optionally, in Manner 1 and Manner 2, that a PRS resource included in the third PRS resource set and a PRS resource included in the at least one fourth PRS resource set have an association relationship is: a third PRS resource in the third PRS resource set and a fourth PRS resource in the at least one fourth PRS resource set have the association relationship; and the third PRS resource and the fourth PRS resource meet one or more of the following conditions: the third PRS resource and the fourth PRS resource have a same PRS resource index; the third PRS resource and the fourth PRS resource occupy a same symbol; or the third PRS resource and the fourth PRS resource have a quasi co-location (QCL) relationship.

In another possible implementation, a manner in which the configuration information indicates the association relationship between the PRSs on the at least two frequencies is: the configuration information indicates an association relationship between PRS resource sets on the at least two frequencies. In other words, the configuration information may indicate the association relationship between the PRSs on the at least two frequencies by indicating the association relationship between the PRS resource sets on the at least two frequencies. This can accurately indicate the association relationship between the PRSs on the at least two frequencies, and indicating the association relationship between the PRSs on the at least two frequencies based on a PRS resource set granularity helps reduce signaling overheads. For example, if the configuration information indicates that a PRS resource set 1 and a PRS resource set 2 have an association relationship, it is equivalent to that the configuration information indicates that a PRS in the PRS resource set 1 and a PRS in the PRS resource set 2 have the association relationship.

Optionally, the configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and second configuration information may indicate the association relationship between the PRS resource sets on the at least two frequencies in the following two implementations:

1. Configuration information of a third PRS resource set further includes an index of at least one fourth PRS resource set, to indicate that the third PRS resource set and the at least one fourth PRS resource set have an association relationship, where the third PRS resource set and the at least one fourth PRS resource set are resource sets on different frequencies configured in the second configuration information. Manner 1 can accurately indicate the association relationship between the PRS resource sets.

2. An index of a third PRS resource set and an index of at least one fourth PRS resource set are configured to be the same, to indicate that the third PRS resource set and the at least one fourth PRS resource set have an association relationship, where the third PRS resource set and the at least one fourth PRS resource set are resource sets on different frequencies configured in the second configuration information. In Manner 2, the association relationship between the PRS resource sets can be indicated without adding additional information to the second configuration information, to help reduce signaling overheads.

Optionally, in Manner 1 and Manner 2, a third PRS in the third PRS resource set and a fourth PRS in the at least one fourth PRS resource set have an association relationship; and the third PRS and the fourth PRS meet one or more of the following conditions: the third PRS and the fourth PRS have a same resource index; the third PRS and the fourth PRS occupy a same symbol; or the third PRS and the fourth PRS have a QCL relationship.

In a possible implementation, the terminal device sends capability information to the positioning management device, where the capability information indicates one or more of the following information: maximum aggregated bandwidth supported by the terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, where the aggregated bandwidth is bandwidth of PRSs having an association relationship. The capability information of the terminal device is reported to the positioning management device, so that the positioning management device can accurately determine, based on the capability information of the terminal device, specific PRS configurations that should be notified to the terminal device. Alternatively, the positioning management device may perform another operation based on the capability information of the terminal device.

In a possible implementation, a reporting granularity of the capability information is reporting by frequency band, reporting by frequency band group, reporting by frequency band in each frequency band group, or reporting by frequency band subset in each frequency band group. Based on this possible implementation, the capability information of the terminal device can be reported at a fine granularity.

In a possible implementation, an implementation in which the terminal device measures the PRSs having the association relationship is: when the PRSs having the association relationship meet a first condition, the terminal device measures the PRSs having the association relationship. The first condition includes any one or more of the following conditions: the PRSs having the association relationship have a same subcarrier spacing; the PRSs having the association relationship have a same cyclic prefix type; the PRSs having the association relationship occupy a same symbol, the PRSs having the association relationship overlap in time domain, or the PRSs having the association relationship partially overlap in time domain; total bandwidth of the PRSs having the association relationship is less than the maximum aggregated bandwidth supported by the terminal device; or a quantity of frequencies on which the PRSs having the association relationship are located is less than a maximum quantity of associated frequencies supported by the terminal device.

When the PRSs having the association relationship have a same subcarrier spacing, have a same cyclic prefix type, occupy a same symbol, or partially overlap in time domain, it can be more convenient for the terminal device to perform joint measurement on the PRSs having the association relationship. Joint measurement is performed on the PRSs having the association relationship only when the total bandwidth of the PRSs having the association relationship is less than the maximum aggregated bandwidth supported by the terminal device, or the quantity of frequencies on which the PRSs having the association relationship are located is less than the maximum quantity of associated frequencies supported by the terminal device. This can ensure that the terminal device successfully performs the joint measurement on the PRSs having the association relationship.

In a possible implementation, if the total bandwidth of the PRSs having the association relationship is greater than the maximum aggregated bandwidth supported by the terminal device, or the quantity of frequencies on which the PRSs having the association relationship are located is greater than the maximum quantity of associated frequencies supported by the terminal device, the terminal device determines, from the PRSs having the association relationship, a PRS combination of maximum bandwidth supported by a terminal device capability. The terminal device measures a signal on the PRS combination. Based on this possible implementation, even if the total bandwidth of the PRSs having the association relationship is greater than the maximum aggregated bandwidth supported by the terminal device, or the quantity of frequencies on which the PRSs having the association relationship are located is greater than the maximum quantity of associated frequencies supported by the terminal device, the terminal device can also perform the joint measurement on PRSs on a plurality of frequencies.

In a possible implementation, the terminal device sends a measurement result to the positioning management device. The measurement result is obtained by the terminal device by measuring the PRSs having the association relationship, and the measurement result includes an index of a resource set in which the PRSs having the association relationship are located and/or a resource index of the PRSs having the association relationship. Based on the possible implementation, it is helpful for the positioning management device to accurately determine specific PRSs based on which the measurement result is obtained through measurement.

In a possible implementation, that the PRSs having the association relationship share a same antenna port or the PRSs having the association relationship have a phase difference may alternatively be replaced with that the PRSs having the association relationship have a QCL relationship. The PRSs having the association relationship have a QCL relationship. In this way, the terminal device measures a plurality of PRSs having the association relationship, and may combine a plurality of measurement results after obtaining the plurality of measurement results corresponding to the plurality of PRSs, to obtain a frequency diversity gain and improve positioning precision.

According to a second aspect, this application provides a PRS association method. The method includes:

A positioning management device receives first configuration information sent by a network device. The first configuration information indicates an association relationship between PRSs on at least two frequencies. The positioning management device sends second configuration information to a terminal device. The second configuration information indicates an association relationship between PRSs on at least two frequencies. The PRSs having the association relationship share a same antenna port or the PRSs having the association relationship have a phase difference.

In a possible implementation, the first configuration information and the second configuration information further indicate that the PRSs having the association relationship share a same antenna port or the PRSs having the association relationship have a phase difference.

In a possible implementation, in a process in which the terminal device measures the PRSs having the association relationship, the phase difference between the PRSs having the association relationship is a fixed value.

In a possible implementation, a manner in which the first configuration information indicates the association relationship between the PRSs on the at least two frequencies is specifically: the first configuration information indicates an association relationship between PRS resources on the at least two frequencies. In other words, the first configuration information may indicate the association relationship between the PRSs on the at least two frequencies by indicating the association relationship between the PRS resources on the at least two frequencies. This can accurately and precisely indicate the association relationship between the PRSs on the at least two frequencies. For example, if the first configuration information indicates that a PRS resource 1 and a PRS resource 2 have an association relationship, it is equivalent to that the first configuration information indicates that a PRS corresponding to the PRS resource 1 and a PRS corresponding to the PRS resource 2 have the association relationship.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the first configuration information may indicate the association relationship between the PRS resources on the at least two frequencies in the following three specific implementations:

1. Configuration information of a first PRS resource set further includes an index of at least one second PRS resource set, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information. Manner 1 can indicate, based on a resource set granularity, the PRS resources having the association relationship, to help reduce signaling overheads.

2. An index of a first PRS resource set and an index of at least one second PRS resource set are configured to be the same, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information. Manner 2 can indicate, based on a resource set granularity, the PRS resources having the association relationship, and in Manner 2, additional information does not need to be added to the first configuration information to indicate the PRS resources having the association relationship, to help reduce signaling overheads.

3. Configuration information of a first PRS resource further includes at least one piece of first index information, the first index information includes an index of a second PRS resource set and an index of a second PRS resource in the second PRS resource set, to indicate that the first PRS resource and at least one second PRS resource have an association relationship, where the first PRS resource and the at least one second PRS resource are resources on different frequencies configured in the first configuration information. Manner 3 can indicate, based on a PRS resource granularity, the PRS resources having the association relationship, and indicate an association relationship between PRS resources on different frequencies more precisely.

Optionally, that a PRS resource included in the first PRS resource set and a PRS resource included in the at least one second PRS resource set have an association relationship is: a first PRS resource in the first PRS resource set and a second PRS resource in the at least one second PRS resource set have the association relationship; and the first PRS resource and the second PRS resource meet one or more of the following conditions: the first PRS resource and the second PRS resource have a same PRS resource index; the first PRS resource and the second PRS resource occupy a same symbol; or the first PRS resource and the second PRS resource have a QCL relationship.

In another possible implementation, a manner in which the first configuration information indicates the association relationship between the PRSs on the at least two frequencies is: the first configuration information indicates an association relationship between PRS resource sets on the at least two frequencies. In other words, the first configuration information may indicate the association relationship between the PRSs on the at least two frequencies by indicating the association relationship between the PRS resource sets on the at least two frequencies. This can accurately indicate the association relationship between the PRSs on the at least two frequencies, and indicating the association relationship between the PRSs on the at least two frequencies based on a PRS resource set granularity helps reduce signaling overheads. For example, if the first configuration information indicates that a PRS resource set 1 and a PRS resource set 2 have an association relationship, it is equivalent to that the first configuration information indicates that a PRS in the PRS resource set 1 and a PRS in the PRS resource set 2 have the association relationship.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the first configuration information may indicate the association relationship between the PRS resource sets on the at least two frequencies in the following two implementations:

1. Configuration information of a first PRS resource set further includes an index of at least one second PRS resource set, to indicate that the first PRS resource set and the at least one second PRS resource set have an association relationship, where the first PRS resource set and the at least one second PRS resource set are resource sets on different frequencies configured in the first configuration information. Manner 1 can accurately indicate the association relationship between the PRS resource sets.

2. An index of a first PRS resource set and an index of at least one second PRS resource set are configured to be the same, to indicate that the first PRS resource set and the at least one second PRS resource set have an association relationship, where the first PRS resource set and the at least one second PRS resource set are resource sets on different frequencies configured in the first configuration information. In Manner 2, the association relationship between the PRS resource sets can be indicated without adding additional information to the first configuration information, to help reduce signaling overheads.

Optionally, a first PRS in the first PRS resource set and a second PRS in the at least one second PRS resource set have an association relationship; and the first PRS and the second PRS meet one or more of the following conditions: the first PRS and the second PRS have a same resource index; the first PRS and the second PRS occupy a same symbol; or the first PRS and the second PRS have a QCL relationship.

In a possible implementation, a manner in which the second configuration information indicates the association relationship between the PRSs on the at least two frequencies is: the second configuration information indicates an association relationship between PRS resources on the at least two frequencies.

Optionally, the second configuration information includes configuration information of a plurality of frequencies, the configuration information of the frequency includes an index
of the frequency and configuration information of a PRS
resource set on the frequency, the configuration information
of the PRS resource set includes an index of the PRS
resource set and configuration information of a PRS 5
resource in the PRS resource set, and the configuration
information of the PRS resource includes an index of the
PRS resource; and the second configuration information
may indicate the association relationship between the PRS
resources on the at least two frequencies in the following
three specific implementations:

1. Configuration information of a third PRS resource set
     further includes an index of at least one fourth PRS
     resource set, to indicate that a PRS resource included in
     the third PRS resource set and a PRS resource included
in the at least one fourth PRS resource set have an
     association relationship, where the third PRS resource
     set and the at least one fourth PRS resource set are
     resource sets on different frequencies configured in the
     second configuration information.
2. An index of a third PRS resource set and an index of
     at least one fourth PRS resource set are configured to be
     the same, to indicate that a PRS resource included in
     the third PRS resource set and a PRS resource included
     in the at least one fourth PRS resource set have an
association relationship, where the third PRS resource
     set and the at least one fourth PRS resource set are
     resource sets on different frequencies configured in the
     second configuration information.
   3. Configuration information of a third PRS resource
further includes at least one piece of second index
     information, the second index information includes an
     index of a fourth PRS resource set and an index of a
     fourth PRS resource in the fourth PRS resource set, to
     indicate that the third PRS resource and at least one
fourth PRS resource have an association relationship,
     where the third PRS resource and the at least one fourth
     PRS resource are resources on different frequencies
     configured in the second configuration information.

Optionally, that a PRS resource included in the third PRS
resource set and a PRS resource included in the at least one
fourth PRS resource set have an association relationship is:
a third PRS resource in the third PRS resource set and a
fourth PRS resource in the at least one fourth PRS resource
set have the association relationship; and the third PRS
resource and the fourth PRS resource meet one or more of
the following conditions: the third PRS resource and the
fourth PRS resource have a same PRS resource index; the
third PRS resource and the fourth PRS resource occupy a
same symbol; or the third PRS resource and the fourth PRS
resource have a QCL relationship.

In another possible implementation, a manner in which
the second configuration information indicates the associa-
tion relationship between the PRSs on the at least two
frequencies is: the second configuration information indicates an association relationship between PRS resource sets
on the at least two frequencies. In other words, the second
configuration information may indicate the association rela-
tionship between the PRSs on the at least two frequencies by
indicating the association relationship between the PRS
resource sets on the at least two frequencies.

Optionally, the second configuration information includes
configuration information of a plurality of frequencies, the
configuration information of the frequency includes an index
of the frequency and configuration information of a PRS
resource set on the frequency, the configuration information
of the PRS resource set includes an index of the PRS resource set and configuration information of a PRS
resource in the PRS resource set, and the configuration
information of the PRS resource includes an index of the
PRS resource; and the second configuration information
may indicate the association relationship between the PRS
resource sets on the at least two frequencies in the following
two specific implementations:

1. Configuration information of a third PRS resource set
     further includes an index of at least one fourth PRS
     resource set, to indicate that the third PRS resource set
     and the at least one fourth PRS resource set have an
     association relationship, where the third PRS resource
     set and the at least one fourth PRS resource set are
     resource sets on different frequencies configured in the
     second configuration information.
   2. An index of a third PRS resource set and an index of
     at least one fourth PRS resource set are configured to be
     the same, to indicate that the third PRS resource set and
     the at least one fourth PRS resource set have an
     association relationship, where the third PRS resource
     set and the at least one fourth PRS resource set are
     resource sets on different frequencies configured in the
     second configuration information.

Optionally, a third PRS in the third PRS resource set and
a fourth PRS in the at least one fourth PRS resource set have
an association relationship; and the third PRS and the fourth
PRS meet one or more of the following conditions: the third
PRS and the fourth PRS have a same resource index; the
third PRS and the fourth PRS occupy a same symbol; or the
third PRS and the fourth PRS have a QCL relationship.

In a possible implementation, the positioning manage-
ment device receives capability information reported by the
terminal device, where the capability information indicates
one or more of the following information: maximum aggre-
gated bandwidth supported by the terminal device, a maxi-
mum quantity of aggregated frequencies supported by the
terminal device, whether the terminal device supports joint
measurement on PRSs on a plurality of frequencies, or a
capability of performing joint processing by the terminal
device on PRSs on a plurality of frequencies, where the
aggregated bandwidth is bandwidth of PRSs having an
association relationship.

In a possible implementation, a reporting granularity of
the capability information is reporting by frequency band,
reporting by frequency band group, reporting by frequency
band in each frequency band group, or reporting by fre-
quency band subset in each frequency band group.

In a possible implementation, the positioning manage-
ment device receives a measurement result sent by the
terminal device. The measurement result is obtained by the
terminal device by measuring the PRSs having the associa-
tion relationship, and the measurement result includes an
index of a resource set in which the PRSs having the
association relationship are located and/or a resource index
of the PRSs having the association relationship.

In a possible implementation, that the PRSs having the
association relationship share a same antenna port or the
PRSs having the association relationship have a phase
difference may alternatively be replaced with that the PRSs
having the association relationship have a QCL relationship.

For beneficial effects of the second aspect, refer to the
beneficial effects of the first aspect. Details are not described
herein again.

According to a third aspect, this application provides a
positioning reference signal PRS association method. The
method includes:

A network device sends first configuration information to a positioning management device. The first configuration information indicates an association relationship between PRSs on at least two frequencies. The network device sends the PRSs having the association relationship. The PRSs having the association relationship share a same antenna port or the PRSs having the association relationship have a phase difference.

In a possible implementation, the first configuration information further indicates that the PRSs having the association relationship share a same antenna port or the PRSs having the association relationship have a phase difference.

In a possible implementation, in a process in which the terminal device measures the PRSs having the association relationship, the phase difference between the PRSs having the association relationship is a fixed value.

In a possible implementation, a manner in which the first configuration information indicates the association relationship between the PRSs on the at least two frequencies is: the first configuration information indicates an association relationship between PRS resources on the at least two frequencies.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the first configuration information may indicate the association relationship between the PRS resources on the at least two frequencies in the following three specific implementations:

1. Configuration information of a first PRS resource set further includes an index of at least one second PRS resource set, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information.
 2. An index of a first PRS resource set and an index of at least one second PRS resource set are configured to be the same, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information.
 3. Configuration information of a first PRS resource further includes at least one piece of first index information, the first index information includes an index of a second PRS resource set and an index of a second PRS resource in the second PRS resource set, to indicate that the first PRS resource and at least one second PRS resource have an association relationship, where the first PRS resource and the at least one second PRS resource are resources on different frequencies configured in the first configuration information.

Optionally, that a PRS resource included in the first PRS resource set and a PRS resource included in the at least one second PRS resource set have an association relationship is: a first PRS resource in the first PRS resource set and a second PRS resource in the at least one second PRS resource set have the association relationship; and the first PRS resource and the second PRS resource meet one or more of the following conditions: the first PRS resource and the second PRS resource have a same PRS resource index; the first PRS resource and the second PRS resource occupy a same symbol; or the first PRS resource and the second PRS resource have a QCL relationship.

In another possible implementation, a manner in which the first configuration information indicates the association relationship between the PRSs on the at least two frequencies is: the first configuration information indicates an association relationship between PRS resource sets on the at least two frequencies. In other words, the first configuration information may indicate the association relationship between the PRSs on the at least two frequencies by indicating the association relationship between the PRS resource sets on the at least two frequencies.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the first configuration information may indicate the association relationship between the PRS resource sets on the at least two frequencies in the following two specific implementations:

1. Configuration information of a first PRS resource set further includes an index of at least one second PRS resource set, to indicate the first PRS resource set and the at least one second PRS resource set, where the first PRS resource set and the at least one second PRS resource set are resource sets on different frequencies configured in the first configuration information.
 2. An index of a first PRS resource set and an index of at least one second PRS resource set are configured to be the same, to indicate that the first PRS resource set and the at least one second PRS resource set have an association relationship, where the first PRS resource set and the at least one second PRS resource set are resource sets on different frequencies configured in the first configuration information.

Optionally, a first PRS in the first PRS resource set and a second PRS in the at least one second PRS resource set have an association relationship; and the first PRS and the second PRS meet one or more of the following conditions: the first PRS and the second PRS have a same resource index; the first PRS and the second PRS occupy a same symbol; or the first PRS and the second PRS have a QCL relationship.

In a possible implementation, that the PRSs having the association relationship share a same antenna port or the PRSs having the association relationship have a phase difference may alternatively be replaced with that the PRSs having the association relationship have a QCL relationship.

For beneficial effects of the third aspect, refer to the beneficial effects of the first aspect and the second aspect. Details are not described herein again.

According to a fourth aspect, a communication apparatus is provided. The apparatus may be a terminal device, an apparatus in the terminal device, or an apparatus that can be used cooperatively with the terminal device. The communication apparatus may alternatively be a chip system. The communication apparatus may perform the method according to the first aspect. A function of the communication apparatus may be implemented by hardware, or may be implemented by hardware by executing corresponding software. The hardware or the software includes one or more units corresponding to the function. The unit may be software and/or hardware. For operations performed by the communication apparatus and beneficial effects thereof, refer to the method in the first aspect and the beneficial effects thereof. Repeated parts are not described again.

According to a fifth aspect, a communication apparatus is provided. The apparatus may be a positioning management device, an apparatus in the positioning management device, or an apparatus that can be used cooperatively with the positioning management device. The communication apparatus may alternatively be a chip system. The communication apparatus may perform the method according to the second aspect. A function of the communication apparatus may be implemented by hardware, or may be implemented by hardware by executing corresponding software. The hardware or the software includes one or more units corresponding to the function. The unit may be software and/or hardware. For operations performed by the communication apparatus and beneficial effects thereof, refer to the method in the second aspect and the beneficial effects thereof. Repeated parts are not described again.

According to a sixth aspect, a communication apparatus is provided. The apparatus may be a network device, an apparatus in the network device, or an apparatus that can be used cooperatively with the network device. The communication apparatus may alternatively be a chip system. The communication apparatus may perform the method in the third aspect. A function of the communication apparatus may be implemented by hardware, or may be implemented by hardware by executing corresponding software. The hardware or the software includes one or more units corresponding to the function. The unit may be software and/or hardware. For operations performed by the communication apparatus and beneficial effects thereof, refer to the method in the third aspect and the beneficial effects thereof. Repeated parts are not described again.

According to a seventh aspect, this application provides a communication apparatus. The communication apparatus includes a processor. When the processor invokes a computer program in a memory, the method performed by the terminal device in the method in the first aspect is performed.

According to an eighth aspect, this application provides a communication apparatus. The communication apparatus includes a processor. When the processor invokes a computer program in a memory, the method performed by the positioning management device in the method in the second aspect is performed.

According to a ninth aspect, this application provides a communication apparatus. The communication apparatus includes a processor. When the processor invokes a computer program in a memory, the method performed by the network device in the method in the third aspect is performed.

According to a tenth aspect, this application provides a communication apparatus. The communication apparatus includes a processor and a memory. The memory is configured to store computer-executable instructions. The processor is configured to execute the computer-executable instructions stored in the memory, to enable the communication apparatus to perform the method performed by the terminal device in the first aspect.

According to an eleventh aspect, this application provides a communication apparatus. The communication apparatus includes a processor and a memory. The memory is configured to store computer-executable instructions. The processor is configured to execute the computer-executable instructions stored in the memory, to enable the communication apparatus to perform the method performed by the positioning management device in the second aspect.

According to a twelfth aspect, this application provides a communication apparatus. The communication apparatus includes a processor and a memory. The memory is configured to store computer-executable instructions. The processor is configured to execute the computer-executable instructions stored in the memory, to enable the communication apparatus to perform the method performed by the network device in the third aspect.

According to a thirteenth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the terminal device in the method in the first aspect.

According to a fourteenth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the positioning management device in the method in the second aspect.

According to a fifteenth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the network device in the method in the third aspect.

According to a sixteenth aspect, this application provides a communication apparatus. The communication apparatus includes a processor and an interface circuit. The interface circuit is configured to receive computer-executable instructions and transmit the computer-executable instructions to the processor. The processor runs the computer-executable instructions to perform the method performed by the terminal device in the method in the first aspect.

According to a seventeenth aspect, this application provides a communication apparatus. The communication apparatus includes a processor and an interface circuit. The interface circuit is configured to receive computer-executable instructions and transmit the computer-executable instructions to the processor. The processor runs the computer-executable instructions to perform the method performed by the positioning management device in the method in the second aspect.

According to an eighteenth aspect, this application provides a communication apparatus. The communication apparatus includes a processor and an interface circuit. The interface circuit is configured to receive computer-executable instructions and transmit the computer-executable instructions to the processor. The processor runs the computer-executable instructions to perform the method performed by the network device in the method in the third aspect.

According to a nineteenth aspect, this application provides a computer-readable storage medium. The computer-readable storage medium is configured to store computer-executable instructions. When the computer-executable instructions are executed, the method performed by the terminal device in the method in the first aspect is implemented.

According to a twentieth aspect, this application provides a computer-readable storage medium. The computer-readable storage medium is configured to store computer-executable instructions. When the computer-executable instructions are executed, the method performed by the positioning management device in the method in the second aspect is implemented.

According to a twenty-first aspect, this application provides a computer-readable storage medium. The computer-readable storage medium is configured to store computer-executable instructions. When the computer-executable instructions are executed, the method performed by the network device in the method in the third aspect is implemented.

According to a twenty-second aspect, this application provides a computer program product including a computer program. When the computer program is executed, the method performed by the terminal device in the method in the first aspect is implemented.

According to a twenty-third aspect, this application provides a computer program product including a computer program. When the computer program is executed, the method performed by the positioning management device in the method in the second aspect is implemented.

According to a twenty-fourth aspect, this application provides a computer program product including a computer program. When the computer program is executed, the method performed by the network device in the method in the third aspect is implemented.

According to a twenty-fifth aspect, this application provides a communication system. The communication system includes the communication apparatus according to the fourth aspect, the seventh aspect, the tenth aspect, the thirteenth aspect, or the sixteenth aspect, the communication apparatus according to the fifth aspect, the eighth aspect, the eleventh aspect, the fourteenth aspect, or the seventeenth aspect, and the communication apparatus according to the sixth aspect, the ninth aspect, the twelfth aspect, the fifteenth aspect, or the eighteenth aspect.

DESCRIPTION OF EMBODIMENTS

The following further describes specific embodiments of this application in detail with reference to accompanying drawings.

In the specification, the claims, and the accompanying drawings of this application, terms such as "first", "second", and the like are intended to distinguish between different objects but do not indicate a particular order. In addition, terms "including", "having", or any other variant thereof, are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, "at least two (items)" means two, three, or more, and "and/or" is used to describe a correspondence between corresponding objects, and indicates that there may be three relationships. For example, "A and/or B" may indicate the following three cases: Only A exists, only B exists, and both A and B exist, where A and B may be singular or plural. The character "/" generally represents an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand the solutions provided in this application, the following first describes a system architecture in this application.

The method provided in embodiments of this application may be applied to various communication systems, for example, an internet of things (IoT) system, a narrow band internet of things (NB-IoT) system, a long term evolution (LTE) system, a 5th-generation (5G) communication system, an LTE-5G hybrid architecture, a 5G new radio (NR)

system, and a new communication system emerging in future communication development.

Figure 1:
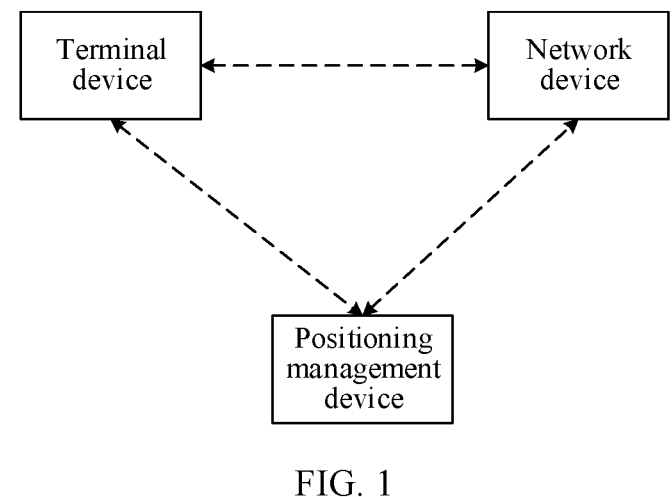
FIG. 1 is a schematic diagram of a structure of a system architecture according to an embodiment of this application.

FIG. 1 is a schematic diagram of a system architecture according to an embodiment of this application. As shown in FIG. 1, the system architecture includes a terminal device, a network device, and a positioning management device.

The terminal device in embodiments of this application is an entity that is on a user side and that is configured to receive or transmit a signal. The terminal device may be a device that provides voice and/or data connectivity for a user, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or a vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). Common terminal devices include, for example, a car, a drone, a mechanical arm, a mobile phone, a tablet computer, a notebook computer, a palmtop computer, a mobile internet device (MID), and a wearable device such as a smartwatch, a smart band, or a pedometer. However, embodiments of this application are not limited thereto.

The network device in embodiments of this application is an entity that is on a network side and that is configured to transmit or receive a signal, may be configured to mutually convert a received over-the-air frame and an internet protocol (IP) packet, and serves as a router between a terminal device and a remaining part of an access network. The remaining part of the access network may include an IP network and the like. The network device may further coordinate attribute management of an air interface. For example, the network device may be an evolved NodeB (eNB, or e-NodeB) in LTE, a new radio controller (NR controller), an ng-eNB, a gNodeB (gNB) in a 5G system, a centralized network element (e.g., centralized unit), a new radio base station, a radio remote module, a micro base station, a relay, a distributed network element (e.g., distributed unit), or any other radio access device. However, embodiments of this application are not limited thereto.

In embodiments of this application, one network device may include one or more cells, and each cell includes one or more transmission reception points (TRPs) or transmission points (TPs).

The positioning management device is a device that is on the network side and that is configured to determine positioning information of the terminal device. The positioning management device may be a location management function (LMF) entity, an evolved serving mobile location center (E-SMLC), or another device that can be used to determine the positioning information of the terminal device.

Figure 2:
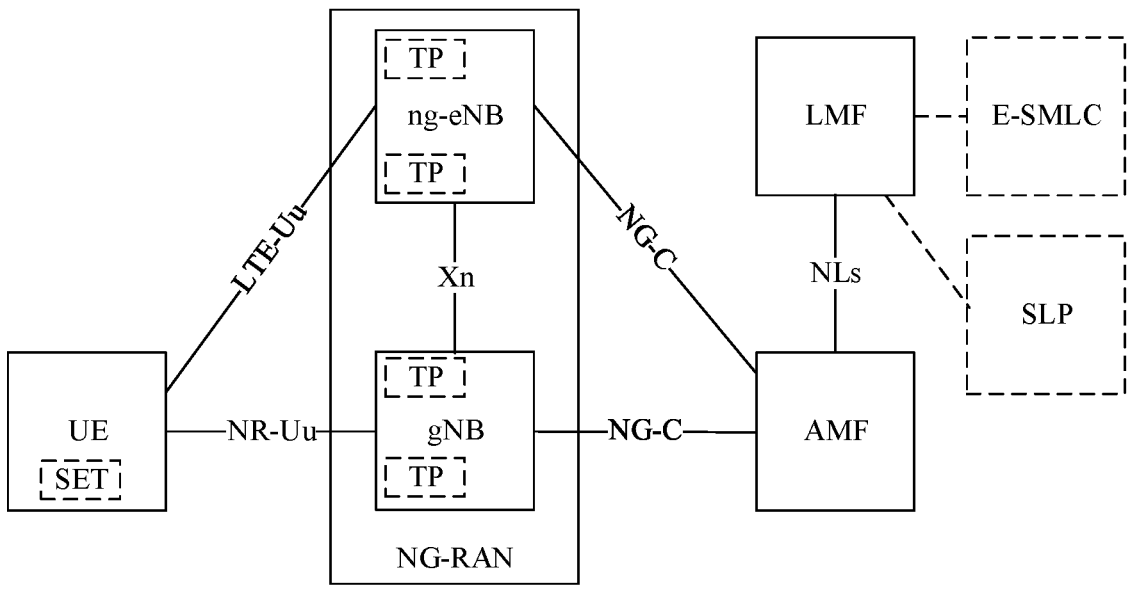
FIG. 2 is a schematic diagram of a structure of another system architecture according to an embodiment of this application.

In a possible implementation, another device may be further included based on the system architecture shown in FIG. 1. For example, FIG. 2 is a schematic diagram of another system architecture. In FIG. 2, an example in which a terminal device is UE, a network device includes an ng-eNB and a gNB, and a positioning management device is an LMF is used. As shown in FIG. 2, the system architecture may further include an access management function (AMF) entity. The AMF entity is a control plane network function provided by an operator network, and is responsible for access control and mobility management for accessing the operator network by the terminal device. For example, the access control and mobility management includes functions such as mobility status management, temporary user identity allocation, and user authentication and authorization. Optionally, the system architecture may further include a user plane location platform (SLP, SUPL Location Platform) and an enhanced serving mobile location center (E-SMLC) entity. In embodiments of this application, only a network device that closely relates to a positioning information determining method proposed in this application is described, and details of another related network device are not described.

Rel-16 positioning standardizes a downlink positioning reference signal (DL PRS) to support the following positioning technologies:

1. Downlink time difference of arrival (DL-TDOA) positioning technology: in the positioning technology, the terminal device measures a downlink reference signal time difference of arrival (DL RSTD) for a PRS sent by each cell, and reports a measurement result to an LMF. The LMF performs positioning on the terminal device based on the measurement result.

2. Downlink angle of departure (DL-AoD) positioning technology: In the positioning technology, the terminal device measures reference signal received power (RSRP) for a PRS sent by each cell, and reports a measurement result to the LMF. The LMF performs positioning on the terminal device based on the measurement result.

3. Multi-cell round trip time (Multi-RTT) positioning technology: in the positioning technology, the terminal device measures a user equipment receiving-sending time difference (e.g., UE-RxTxTimeDiff, UE Rx-Tx time difference) for a PRS sent by each cell, and reports a measurement result to the LMF. Each cell measures a gNB receiving-sending time difference (e.g., gNB-RxTxTimeDiff, gNB Rx-Tx time difference) for an SRS sent by the terminal device, and reports a measurement result to the LMF. The LMF performs positioning on the terminal device based on the measurement result.

In the foregoing positioning technologies, a TRP or a TP in each cell may send a PRS, and an example in which the TRP sends the PRS is used for description in the following. The following describes several concepts related to PRS configuration.

Figure 3:
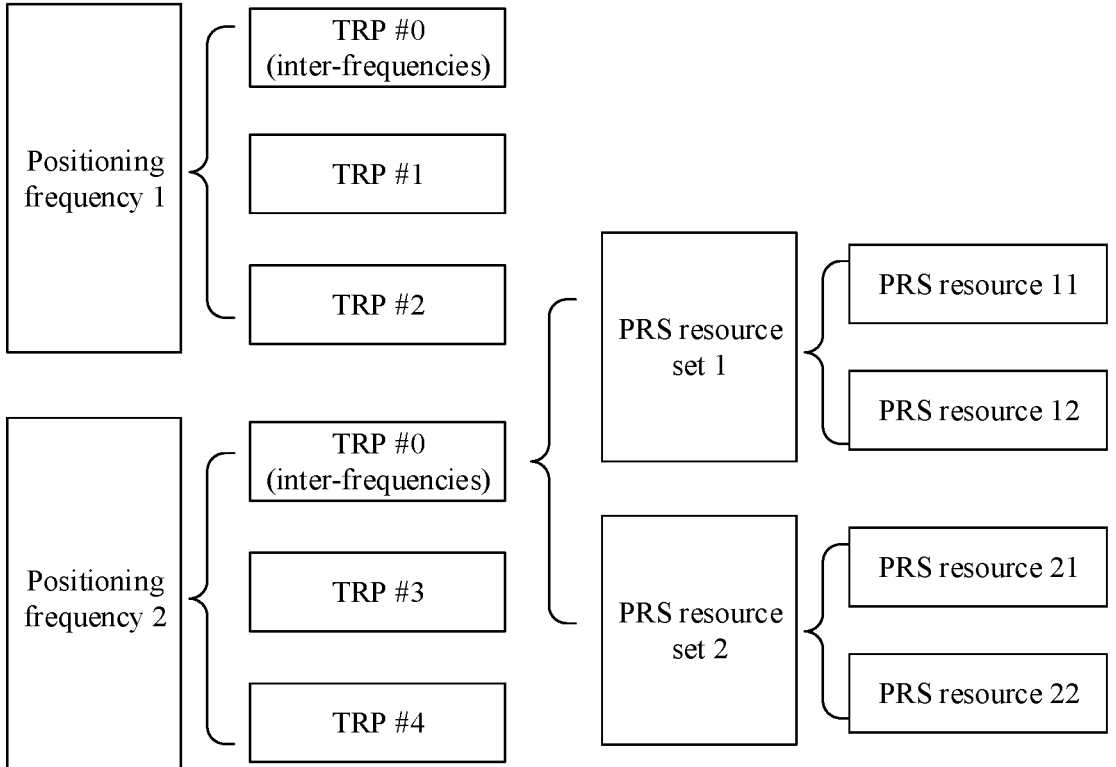
FIG. 3 is a schematic diagram of a positioning reference signal (PRS) configuration level according to an embodiment of this application.

1. Positioning frequency: As shown in FIG. 3, each positioning frequency is a set of a plurality of PRS resource sets on a plurality of TRPs, and belongs to one or more TRPs. PRS resources on one positioning frequency have a same A point (e.g., a start location of a common resource block), same bandwidth, a same subcarrier spacing, and a same comb quantity.

2. TRP: One TRP corresponds to one sending point at an independent location. As shown in FIG. 3, one TRP may include one or more PRS resource sets. There are one or more TRPs on one positioning frequency, and one TRP may also have one or more positioning frequencies. As shown in FIG. 3, a TRP #0 has a positioning frequency 1 and a positioning frequency 2.

3. PRS resource set: One PRS resource set includes one or more PRS resources, and the PRS resources in the PRS resource set have a same periodicity, a same quantity of symbols, and the like. Different TRPs have different PRS resource sets.

4. PRS resource: The PRS resource is a minimum granularity of PRS configuration, and one PRS resource corresponds to one PRS transmit beam.

Currently, in a low-frequency communication system, positioning precision of a positioning technology is not high, and it is difficult to achieve high precision at a level of 0.2 m. A main reason is that maximum bandwidth of a single PRS in a low-frequency NR communication system is 100 MHz while precision of a positioning method based on timing ranging directly relates to bandwidth. Generally, a larger PRS bandwidth indicates higher ranging precision. Therefore, how to enhance an existing PRS configuration structure to implement a large-bandwidth PRS configuration to improve positioning precision is a problem to be urgently resolved currently.

To implement the large-bandwidth PRS configuration, embodiments of this application provide a PRS association method and a communication apparatus. The following further describes in detail the PRS association method and the communication apparatus provided in embodiments of this application.

Figure 4:
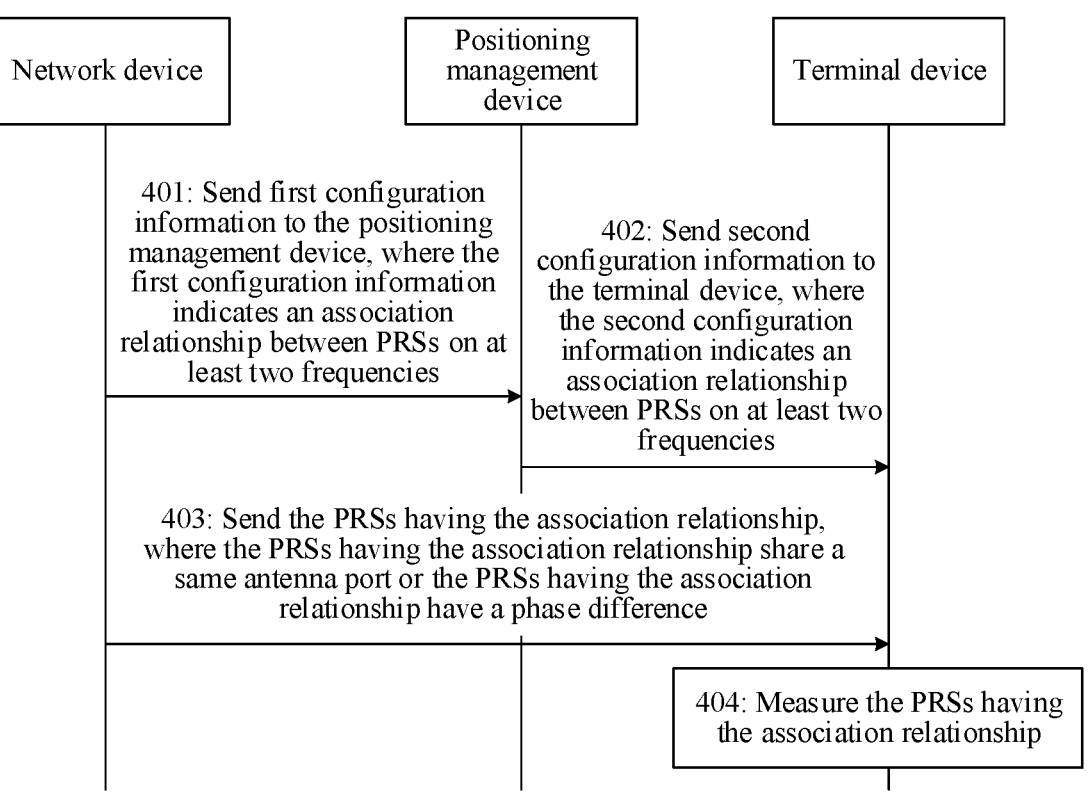
FIG. 4 is a schematic flowchart of a PRS association method according to an embodiment of this application.

FIG. 4 is a schematic flowchart of a PRS association method according to an embodiment of this application. As shown in FIG. 4, the PRS association method includes step 401 to step 404. The method shown in FIG. 4 may be performed by a terminal device, a network device, and a positioning management device, or may be performed by a chip in the terminal device, a chip in the network device, and a chip in the positioning management device. FIG. 4 is described by using an example in which the method is performed by the terminal device, the network device, and the positioning management device.

401: The network device sends first configuration information to the positioning management device. The first configuration information indicates an association relationship between PRSs on at least two frequencies.

The network device may be an access network device, such as a base station, an ng-eNB, or a gNB. One network device may include one or more cells, and each cell includes one or more TRPs or TPs.

The network device may send one or more pieces of first configuration information to the positioning management device. One piece of first configuration information corresponds to one TRP or TP. For example, if the network device has two TRPs: a TRP 1 and a TPR 2, the network device may send, to the positioning management device, first configuration information 1 corresponding to the TRP 1 and first configuration information 2 corresponding to the TRP 2. The first configuration information 1 and the first configuration information 2 may be sent to the positioning management device by using one message. The first configuration information 1 indicates an association relationship between PRSs on at least two frequencies of the TRP 1. The first configuration information 2 indicates an association relationship between PRSs on at least two frequencies of the TRP 2. Optionally, the association relationship in some embodiments may also be referred to as an aggregation relationship or another name, the first configuration information may also be referred to as a PRS configuration or another name, and the frequency in some embodiments may also be referred to as a positioning frequency.

In a possible implementation, a manner in which the first configuration information indicates the association relationship between the PRSs on the at least two frequencies is: the first configuration information indicates an association relationship between PRS resources on the at least two frequencies. In other words, the first configuration information may indicate the association relationship between the PRSs on the at least two frequencies by indicating the association relationship between the PRS resources on the at least two frequencies. This can accurately and precisely indicate the association relationship between the PRSs on the at least two frequencies. For example, if the first configuration information indicates that a PRS resource 1 and a PRS resource 2 have an association relationship, it is equivalent to that the first configuration information indicates that a PRS corresponding to the PRS resource 1 and a PRS corresponding to the PRS resource 2 have the association relationship.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource. In other words, the first configuration information may further indicate which PRS resource sets exist on which frequencies and which PRS resources exist in these PRS resource sets.

Figure 5:
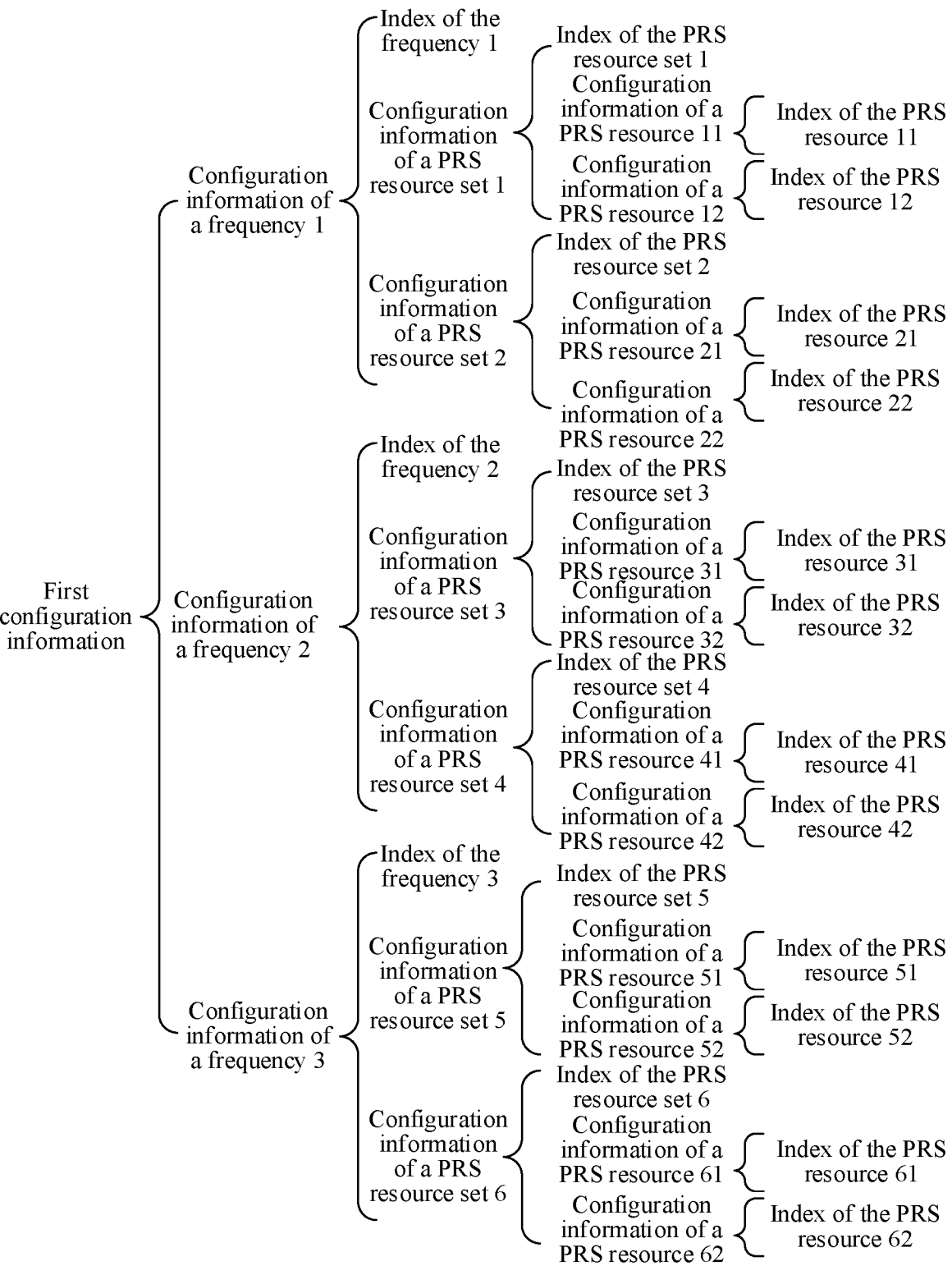
FIG. 5 is a schematic diagram of first configuration information according to an embodiment of this application.

For example, as shown in FIG. 5, a TRP 1 has three frequencies: a frequency 1 to a frequency 3. First configuration information corresponding to the TRP 1 includes configuration information of the frequency 1 to configuration information of the frequency 3. The configuration information of the frequency 1 is used as an example. The configuration information of the frequency 1 includes an index of the frequency 1. Because the frequency 1 includes a PRS resource set 1 and a PRS resource set 2, the configuration information of the frequency 1 further includes configuration information of the PRS resource set 1 and configuration information of the PRS resource set 2. Optionally, the configuration information of the frequency 1 may further include other attribute information of the frequency 1.

The configuration information of the PRS resource set 1 includes an index of the PRS resource set 1. Because the PRS resource set 1 includes a PRS resource 11 and a PRS resource 12, the configuration information of the PRS resource set 1 further includes configuration information of the PRS resource 11 and configuration information of the PRS resource 12. The configuration information of the PRS resource 11 includes an index of the PRS resource 11. The configuration information of the PRS resource 12 includes an index of the PRS resource 12.

The configuration information of the PRS resource set 2 includes an index of the PRS resource set 2. Because the PRS resource set 2 includes a PRS resource 21 and a PRS resource 22, the configuration information of the PRS resource set 2 further includes configuration information of the PRS resource 21 and configuration information of the PRS resource 22. The configuration information of the PRS resource 21 includes an index of the PRS resource 21. The configuration information of the PRS resource 22 includes an index of the PRS resource 22. Optionally, the configuration information of the PRS resource set may further include other attribute information of the PRS resource set. The configuration information of the PRS resource may further include other attribute information of the PRS resource.

In other words, the first configuration information indicates that the TRP 1 includes the PRS resource set 1 and the PRS resource set 2 on the frequency 1. The PRS resource set 1 includes the PRS resource 11 and the PRS resource 12. The PRS resource set 2 includes the PRS resource 21 and the PRS resource 22. Other frequencies are similar, and details are not described herein again.

The first configuration information may indicate the association relationship between the PRS resources on the at least two frequencies in the following three specific implementations.

1. Configuration information of a first PRS resource set further includes an index of at least one second PRS resource set, to indicate that a PRS resource included in the first PRS resource set and a PRS resource included in the at least one second PRS resource set have an association relationship. The first PRS resource set and the second PRS resource set are resource sets on different frequencies configured in the first configuration information. Manner 1 can indicate, based on a resource set granularity, the PRS resources having the association relationship, to help reduce signaling overheads.

For example, an information element structure of the configuration information of the first PRS resource set may be as follows:

frequency 1 includes an index of a PRS resource set 3 on a frequency 2 and an index of a PRS resource set 5 on a frequency 3. In this case, the first configuration information indicates that a PRS resource included in the PRS resource set 1, a PRS resource included in the PRS resource set 3, and a PRS resource included in the PRS resource set 5 have an association relationship.

2. An index of a first PRS resource set and an index of at least one second PRS resource set are configured to be the same, to indicate that a resource included in the first PRS resource set and a PRS resource included in the at least one second PRS resource set have an association relationship, where the first PRS resource set and the second PRS resource set are resource sets on different frequencies configured in the first configuration information. Manner 2 can indicate, based on a resource set granularity, the PRS resources having the association relationship, and in Manner 2, additional information does not need to be added to the first configuration information to indicate the PRS resources having the association relationship, to help reduce signaling overheads.

Figure 7:
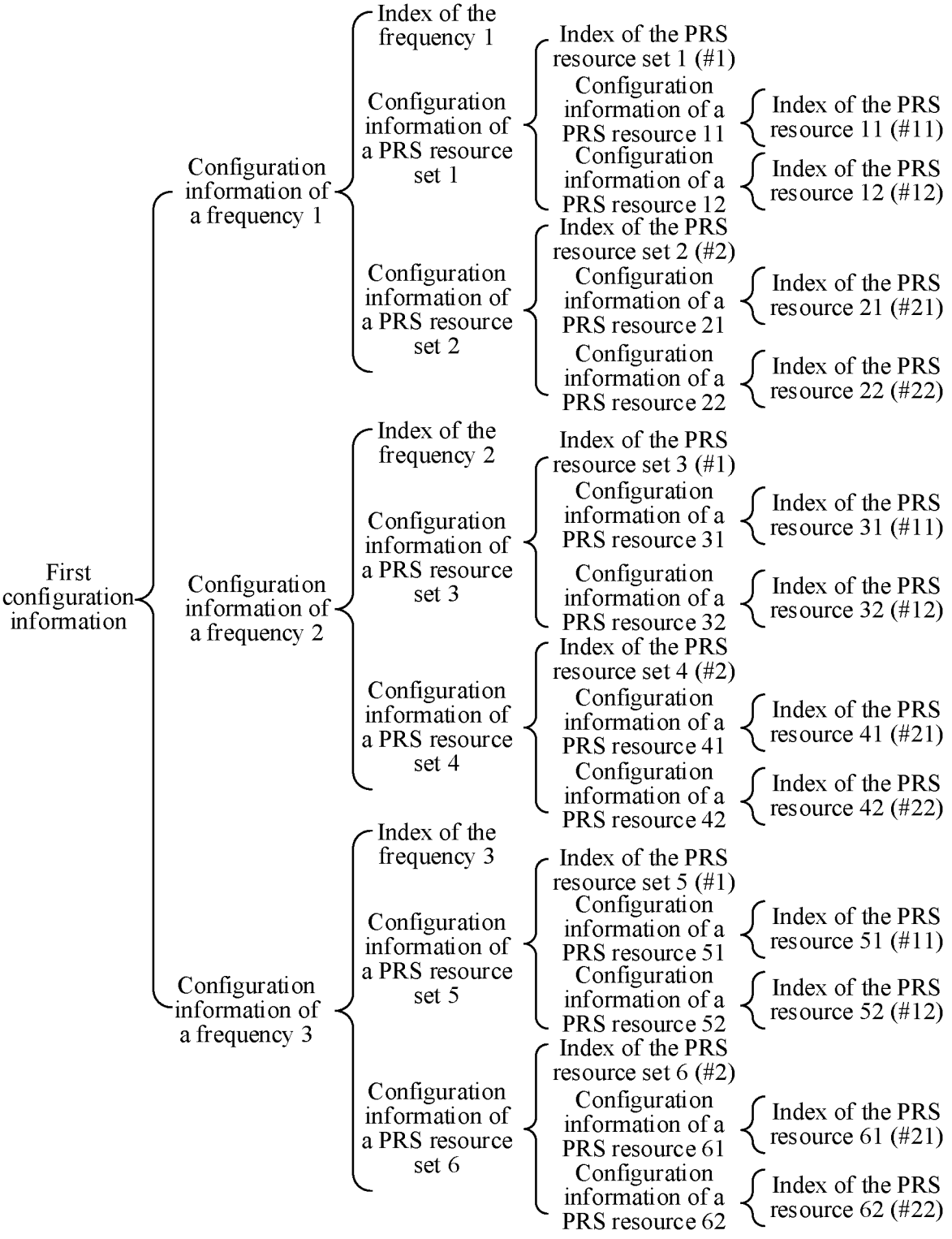
FIG. 7 is a schematic diagram of still other first configuration information according to an embodiment of this application.

For example, as shown in FIG. 7, it is assumed that an index of a PRS resource set 1 on a frequency 1 is #1. An index of a PRS resource set 3 on a frequency 2 is #1. An index of a PRS resource set 5 on a frequency 3 is #1. In this case, the first configuration information indicates that a PRS resource included in the PRS resource set 1, a PRS resource included in the PRS resource set 3, and a PRS resource included in the PRS resource set 5 have an association

```
NR-DL-PRS-Info-r16 ::= SEQUENCE {
    nr-DL-PRS-ResourceSetList-r16 SEQUENCE (SIZE (1..nrMaxSetsPerTrp-
r16)) OF
    NR-DL-PRS-ResourceSet-r16,
        ...
    }
    NR-DL-PRS-ResourceSet-r16 ::= SEQUENCE {
        nr-DL-PRS-ResourceSetID-r16              NR-DL-PRS-ResourceSetID-r16,
        dl-PRS-Periodicity-and-ResourceSetSlotOffset-r16
    NR-DL-PRS-Periodicity-and-ResourceSetSlotOffset-r16,
        dl-PRS-ResourceRepetitionFactor-r16     ENUMERATED {n2, n4, n6, n8, n16,
n32, ...}
    OPTIONAL, -- Need OP
        dl-PRS-ResourceTimeGap-r16              ENUMERATED {s1, s2, s4, s8, s16,
s32, ...}
    OPTIONAL, -- Cond Rep
        dl-PRS-NumSymbols-r16                   ENUMERATED {n2, n4, n6, n12, ...},
        dl-PRS-MutingOption1-r16                DL-PRS-MutingOption1-r16
    OPTIONAL, -- Need OP
        dl-PRS-MutingOption2-r16                DL-PRS-MutingOption2-r16
    OPTIONAL, -- Need OP
        dl-PRS-ResourcePower-r16                INTEGER (-60..50),
        dl-PRS-ResourceList-r16                 SEQUENCE (SIZE
(1..nrMaxResourcesPerSet-r16)) OF
                                                NR-DL-PRS-Resource-r16,
        ...
        [[
        associatedPRS-ResourceSetIdList-r17    SEQUENCE (SIZE (1..
nrMaxSetsPerTrp-r17)) OF
                                                NR-DL-PRS-ResourceSetID-r16 OPTIONAL,-
- Need ON
        ]]
    }
```

NR-DL-PRS-Info-r16 represents the configuration information of the first PRS resource set. The underlined NR-DL-PRS-ResourceSetID-r16 in the configuration information of the first PRS resource set represents the index of the second PRS resource set.

Figure 6:
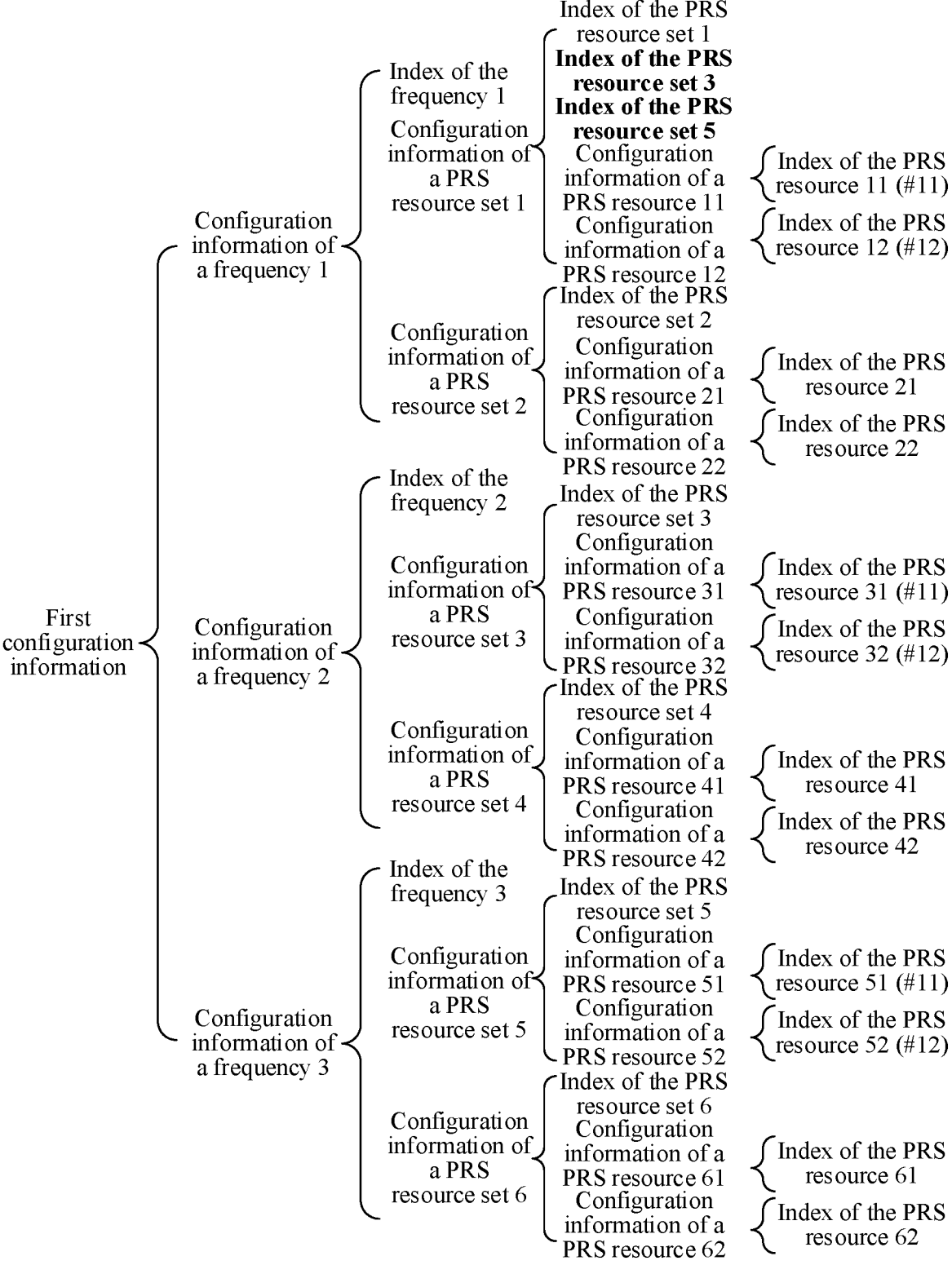
FIG. 6 is a schematic diagram of other first configuration information according to an embodiment of this application.

For another example, as shown in FIG. 6, it is assumed that configuration information of a PRS resource set 1 on a relationship. An index of a PRS resource set 2 on the frequency 1 is #2. An index of a PRS resource set 4 on the frequency 2 is #2. An index of a PRS resource set 6 on the frequency 3 is #2. In this case, the first configuration information indicates that a PRS resource included in the PRS resource set 2, a PRS resource included in the PRS resource set 4, and a PRS resource included in the PRS resource set 6 have an association relationship.

In a possible implementation, in Manner 1 and Manner 2, that a PRS resource included in the first PRS resource set and a PRS resource included in the at least one second PRS resource set have an association relationship is: a first PRS resource in the first PRS resource set and a second PRS resource in the at least one second PRS resource set have the association relationship; and the first PRS resource and the second PRS resource meet one or more of the following conditions: the first PRS resource and the second PRS resource have a same PRS resource index; the first PRS resource and the second PRS resource occupy a same symbol or the first PRS resource and the second PRS resource are sent simultaneously; or the first PRS resource and the second PRS resource have a quasi co-location (QCL) relationship. In other words, if a PRS resource in the first PRS resource set and a PRS resource in the second PRS resource set meet one or more of the foregoing three conditions, the two PRS resources have an association relationship.

For example, the first PRS resource and the second PRS resource meet any one of the following seven cases: 1. The first PRS resource and the second PRS resource have a same PRS resource index. 2. The first PRS resource and the second PRS resource occupy a same symbol or the first PRS resource and the second PRS resource are sent simultaneously. 3. The first PRS resource and the second PRS resource have a QCL relationship. 4. The first PRS resource and the second PRS resource have a same PRS resource index, and the first PRS resource and the second PRS resource occupy a same symbol or the first PRS resource and the second PRS resource are sent simultaneously. 5. The first PRS resource and the second PRS resource have a same PRS resource index, and the first PRS resource and the second PRS resource have a QCL relationship. 6. The first PRS resource and the second PRS resource occupy a same symbol or the first PRS resource and the second PRS resource are sent simultaneously, and the first PRS resource and the second PRS resource have a QCL relationship. 7. The first PRS resource and the second PRS resource have a same PRS resource index, the first PRS resource and the second PRS resource occupy a same symbol or the first PRS resource and the second PRS resource are sent simultaneously, and the first PRS resource and the second PRS resource have a QCL relationship.

That the first PRS resource and the second PRS resource are sent simultaneously may be understood as that the first PRS resource and the second PRS resource occupy a same symbol, or may be understood as that the first PRS resource and the second PRS resource occupy different symbols, but the first PRS resource and the second PRS resource are sent simultaneously because of different timings.

For example, the first PRS resource and the second PRS resource meet the fourth case. As shown in FIG. 7, it is assumed that an index of a PRS resource 11, an index of a PRS resource 31, and an index of a PRS resource 51 are the same, that is, are all #11, and the PRS resource 11, the PRS resource 31, and the PRS resource 51 are sent simultaneously. In this case, the three PRS resources are associated. It is assumed that an index of a PRS resource 12, an index of a PRS resource 32, and an index of a PRS resource 52 are the same, that is, are all #12, and the PRS resource 12, the PRS resource 32, and the PRS resource 52 are sent simultaneously. In this case, the three PRS resources are associated.

3. Configuration information of a first PRS resource further includes at least one piece of first index information, the first index information includes an index of a second PRS resource set and an index of a second PRS resource in the second PRS resource set, to indicate that the first PRS resource and the second PRS resource have an association relationship, where the first PRS resource and the second PRS resource are resources on different frequencies configured in the first configuration information. Manner 3 can indicate, based on a PRS resource granularity, the PRS resources having the association relationship, and indicate an association relationship between PRS resources on different frequencies more precisely.

For example, an information element structure of the configuration information of the first PRS resource may be the following information element structure:

```
NR-DL-PRS-Resource-r16 ::= SEQUENCE {
    nr-DL-PRS-ResourceID-r16                    NR-DL-PRS-ResourceID-r16,
    dl-PRS-SequenceID-r16                       INTEGER (0.. 4095),
    dl-PRS-CombSizeN-and-ReOffset-r16           CHOICE {
        n2-r16                                      INTEGER (0..1),
        n4-r16                                      INTEGER (0..3),
        n6-r16                                      INTEGER (0..5),
        n12-r16                                     INTEGER (0..11)
    },
    dl-PRS-ResourceSlotOffset-r16               INTEGER
(0..nrMaxResourceOffsetValue-1-r16),
    dl-PRS-ResourceSymbolOffset-r16             INTEGER (0..12),
    dl-PRS-QCL-Info-r16                         DL-PRS-QCL-Info-r16
    OPTIONAL,
    ...
    [[
    associatedPRS-ResourceIdList-r16           SEQUENCE (SIZE
(1..nrMaxSetsPerTRP-r17)) OF DL-PRS-ResourceID-Info-r17
    OPTIONAL
    ]]
}
DL-PRS-ResourceID-Info-r17 ::= SEQUENCE {
    nr-DL-PRS-ResourceSetID-r17                 NR-DL-PRS-ResourceSetID-r16,
    nr-DL-PRS-ResourceID-r17                    NR-DL-PRS-ResourceID-r16
    OPTIONAL
}
```

NR-DL-PRS-Resource-r16 is the configuration information of the first PRS resource. The underlined DL-PRS-ResourceID-Info-r17 is the first index information, the underlined NR-DL-PRS-ResourceSetID-r16 is the index of the second PRS resource set, and the underlined NR-DL-PRS-ResourceID-r16 is the index of the second PRS resource.

Figure 8:
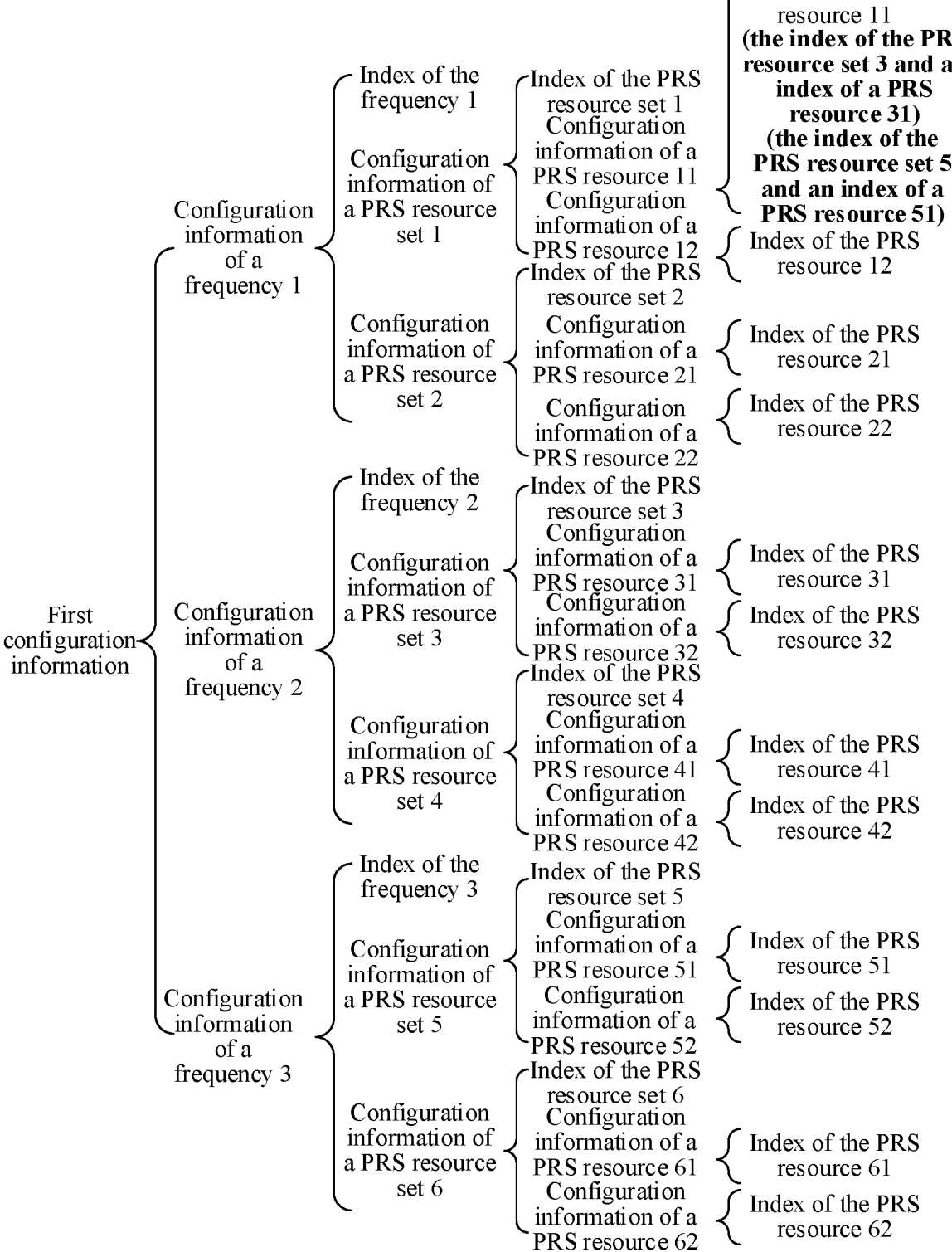
FIG. 8 is a schematic diagram of still other first configuration information according to an embodiment of this application.

For another example, as shown in FIG. 8, it is assumed that configuration information of a PRS resource 11 includes first index information 1 and first index information 2. The first index information 1 includes an index of a PRS resource set 3 and an index of a PRS resource 31. The first index information 2 includes an index of a PRS resource set 5 and an index of a PRS resource 51. In this case, the first configuration information indicates that the PRS resource 11, the PRS resource 31, and the PRS resource 51 have an association relationship.

In another possible implementation, a manner in which the first configuration information indicates the association relationship between the PRSs on the at least two frequencies is: the first configuration information indicates an association relationship between PRS resource sets on the at least two frequencies. In other words, the first configuration information may indicate the association relationship between the PRSs on the at least two frequencies by indicating the association relationship between the PRS resource sets on the at least two frequencies. This can accurately indicate the association relationship between the PRSs on the at least two frequencies, and indicating the association relationship between the PRSs on the at least two frequencies based on a PRS resource set granularity helps reduce signaling overheads. For example, if the first configuration information indicates that a PRS resource set 1 and a PRS resource set 2 have an association relationship, it is equivalent to that the first configuration information indicates that a PRS in the PRS resource set 1 and a PRS in the PRS resource set 2 have the association relationship.

Optionally, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the first configuration information may indicate the association relationship between the PRS resource sets on the at least two frequencies in the following two specific implementations:

1. Configuration information of a first PRS resource set further includes an index of at least one second PRS resource set, to indicate that the first PRS resource set and the at least one second PRS resource set have an association relationship, where the first PRS resource set and the at least one second PRS resource set are resource sets on different frequencies configured in the first configuration information. Manner 1 can accurately indicate the association relationship between the PRS resource sets. For an information element structure of the first PRS resource set, refer to the information element structure of the first PRS resource set in the foregoing method embodiment. Details are not described herein again.

2. An index of a first PRS resource set and an index of at least one second PRS resource set are configured to be the same, to indicate that the first PRS resource set and the at least one second PRS resource set have an association relationship, where the first PRS resource set and the at least one second PRS resource set are resource sets on different frequencies configured in the first configuration information. In Manner 2, the association relationship between the PRS resource sets can be indicated without adding additional information to the first configuration information, to help reduce signaling overheads.

Optionally, a first PRS in the first PRS resource set and a second PRS in the at least one second PRS resource set have an association relationship; and the first PRS and the second PRS meet one or more of the following conditions: the first PRS and the second PRS have a same resource index; the first PRS and the second PRS occupy a same symbol or the first PRS and the second PRS are sent simultaneously; or the first PRS and the second PRS have a QCL relationship.

For example, the first PRS and the second PRS meet any one of the following seven cases: 1. The first PRS and the second PRS have a same resource index. 2. The first PRS and the second PRS occupy a same symbol or the first PRS and the second PRS are sent simultaneously. 3. The first PRS and the second PRS have a QCL relationship. 4. The first PRS and the second PRS have a same resource index, and the first PRS and the second PRS occupy a same symbol or the first PRS and the second PRS are sent simultaneously. 5. The first PRS and the second PRS have a same resource index, and the first PRS and the second PRS have a QCL relationship. 6. The first PRS and the second PRS occupy a same symbol or the first PRS and the second PRS are sent simultaneously, and the first PRS and the second PRS have a QCL relationship. 7. The first PRS and the second PRS have a same resource index, the first PRS and the second PRS occupy a same symbol or the first PRS and the second PRS are sent simultaneously, and the first PRS and the second PRS have a QCL relationship.

In a possible implementation, the network device may actively send the first configuration information to the positioning management device. Alternatively, the network device may send the first configuration information to the positioning management device after receiving a request that is sent by the positioning management device and that is used to request the first configuration information.

402: The positioning management device sends second configuration information to the terminal device. The second configuration information indicates an association relationship between PRSs on at least two frequencies.

In some embodiments, after receiving the first configuration information sent by the network device, the positioning management device sends the second configuration information to the terminal device. The second configuration information may be obtained based on the first configuration information. The first configuration information may be the same as or different from the second configuration information. For example, the first configuration information indicates that a PRS 11 on a frequency 1, a PRS 31 on a frequency 2, and a PRS 51 on a frequency 3 have an association relationship. The second configuration information may only indicate that the PRS 11 on the frequency 1 and the PRS 31 on the frequency 2 have an association relationship.

The positioning management device may send one or more pieces of second configuration information to the terminal device. One piece of second configuration information corresponds to one TRP or TP. For example, if the network device has two TRPs: a TRP 1 and a TPR 2, the network device sends, to the positioning management device, first configuration information 1 corresponding to the TRP 1 and first configuration information 2 corresponding to the TRP 2. The first configuration information 1 indicates an association relationship between PRSs on at least two frequencies of the TRP 1. The first configuration information 2 indicates an association relationship between PRSs on at least two frequencies of the TRP 2. After receiving the first configuration information 1 and the first configuration information 2, the positioning management device sends, to the terminal device, second configuration information 1 corresponding to the TRP 1 and second configuration information 2 corresponding to the TRP 2. The second configuration information 1 and the second configuration information 2 may be sent to the terminal device by using one message. The second configuration information 1 indicates an association relationship between PRSs on at least two frequencies of the TRP 1, and the second configuration information 1 may be obtained based on the first configuration information 1. The second configuration information 2 indicates an association relationship between PRSs on at least two frequencies of the TRP 2, and the second configuration information 2 may be obtained based on the first configuration information 1. Alternatively, after receiving the first configuration information 1 and the first configuration information 2, the positioning management device may send only the second configuration information 1 or only the second configuration information 2.

The second configuration information may also include configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource. In other words, the second configuration information may further indicate specific PRS resource sets that a TRP has on specific frequencies, and which PRS resources exist in these PRS resource sets.

The second configuration information may include configuration information of some frequencies in the first configuration information, or the second configuration information may include configuration information of all frequencies in the first configuration information. For example, the first configuration information includes configuration information of a frequency 1, configuration information of a frequency 2, and configuration information of a frequency 3, and the second configuration information may include only the configuration information of the frequency 1 and the configuration information of the frequency 2.

In a possible implementation, the positioning management device may determine, based on capability information of the terminal device, configuration information of specific frequencies in the first configuration information that should be included in the second configuration information. Alternatively, configuration information of some frequencies is selected from the first configuration information in another manner, to be included in the second configuration information.

In a possible implementation, a manner in which the second configuration information indicates the association relationship between the PRSs on the at least two frequencies is: the second configuration information indicates an association relationship between PRS resources on the at least two frequencies. In other words, the second configuration information may indicate the association relationship between the PRSs on the at least two frequencies by indicating the association relationship between the PRS resources on the at least two frequencies. This can accurately and precisely indicate the association relationship between the PRSs on the at least two frequencies. For example, if the second configuration information indicates that a PRS resource 1 and a PRS resource 2 have an association relationship, it is equivalent to that the second configuration information indicates that a PRS corresponding to the PRS resource 1 and a PRS corresponding to the PRS resource 2 have the association relationship.

Optionally, the second configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the second configuration information may indicate the association relationship between the PRS resources on the at least two frequencies in the following three specific implementations:

1. Configuration information of a third PRS resource set further includes an index of at least one fourth PRS resource set, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information. Manner 1 can indicate, based on a resource set granularity, the PRS resources having the association relationship, to help reduce signaling overheads.

A principle of Manner 1 in which the second configuration information indicates the association relationship between the PRS resources is the same as the principle of Manner 1 in which the first configuration information indicates the association relationship between the PRS resources, and details are not described herein.

2. An index of a third PRS resource set and an index of at least one fourth PRS resource set are configured to be the same, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information. Manner 2 can indicate, based on a resource set granularity, the PRS resources having the association relationship, and in Manner 2, additional information does not need to be added to the second configuration information to indicate the PRS resources having the association relationship, to help reduce signaling overheads.

A principle of Manner 2 in which the second configuration information indicates the association relationship between the PRS resources is the same as the principle of Manner 2 in which the first configuration information indicates the association relationship between the PRS resources, and details are not described herein.

Optionally, in Manner 1 and Manner 2, that a PRS resource included in the third PRS resource set and a PRS resource included in the at least one fourth PRS resource set have an association relationship is: a third PRS resource in the third PRS resource set and a fourth PRS resource in the at least one fourth PRS resource set have the association relationship; and the third PRS resource and the fourth PRS resource meet one or more of the following conditions: the third PRS resource and the fourth PRS resource have a same PRS resource index; the third PRS resource and the fourth PRS resource occupy a same symbol or the third PRS resource and the fourth PRS resource are sent simultaneously; or the third PRS resource and the fourth PRS resource have a QCL relationship.

3. Configuration information of a third PRS resource further includes at least one piece of second index information, the second index information includes an index of a fourth PRS resource set and an index of a fourth PRS resource in the fourth PRS resource set, to indicate that the third PRS resource and at least one fourth PRS resource have an association relationship, where the third PRS resource and the at least one fourth PRS resource are resources on different frequencies configured in the second configuration information. Manner 3 can indicate, based on a PRS resource granularity, the PRS resources having the association relationship, and indicate an association relationship between PRS resources on different frequencies more precisely.

A principle of Manner 3 in which the second configuration information indicates the association relationship between the PRS resources is the same as the principle of Manner 3 in which the first configuration information indicates the association relationship between the PRS resources, and details are not described herein.

In another possible implementation, a manner in which the second configuration information indicates the association relationship between the PRSs on the at least two frequencies is: the second configuration information indicates an association relationship between PRS resource sets on the at least two frequencies. In other words, the second configuration information may indicate the association relationship between the PRSs on the at least two frequencies by indicating the association relationship between the PRS resource sets on the at least two frequencies. This can accurately indicate the association relationship between the PRSs on the at least two frequencies, and indicating the association relationship between the PRSs on the at least two frequencies based on a PRS resource set granularity helps reduce signaling overheads. For example, if the second configuration information indicates that a PRS resource set 1 and a PRS resource set 2 have an association relationship, it is equivalent to that the second configuration information indicates that a PRS in the PRS resource set 1 and a PRS in the PRS resource set 2 have the association relationship.

Optionally, the second configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and the second configuration information may indicate the association relationship between the PRS resource sets on the at least two frequencies in the following two specific implementations:

1. Configuration information of a third PRS resource set further includes an index of at least one fourth PRS resource set, to indicate that the third PRS resource set and the at least one fourth PRS resource set have an association relationship, where the third PRS resource set and the at least one fourth PRS resource set are resource sets on different frequencies configured in the second configuration information. Manner 1 can accurately indicate the association relationship between the PRS resource sets.

2. An index of a third PRS resource set and an index of at least one fourth PRS resource set are configured to be the same, to indicate that the third PRS resource set and the at least one fourth PRS resource set have an association relationship, where the third PRS resource set and the at least one fourth PRS resource set are resource sets on different frequencies configured in the second configuration information. In Manner 2, the association relationship between the PRS resource sets can be indicated without adding additional information to the second configuration information, to help reduce signaling overheads.

Optionally, a third PRS in the third PRS resource set and a fourth PRS in the at least one fourth PRS resource set have an association relationship; and the third PRS and the fourth PRS meet one or more of the following conditions: the third PRS and the fourth PRS have a same resource index; the third PRS and the fourth PRS occupy a same symbol or the third PRS and the fourth PRS are sent simultaneously; or the third PRS and the fourth PRS have a QCL relationship.

403: The network device sends the PRSs having the association relationship. The PRSs having the association relationship share a same antenna port or the PRSs having the association relationship have a phase difference.

In some embodiments, when the network device sends the PRSs having the association relationship, the network device enables the PRSs having the association relationship to share a same antenna port, or enables the PRSs having the association relationship to have a phase difference. Optionally, the network device sends, by using a TRP or a TP, the PRSs having the association relationship.

The antenna port is defined as that a channel of an antenna port carried on one symbol may be inferred by a signal of the antenna port carried on another symbol. In other words, if a channel of an antenna port carried on one symbol can be inferred by a channel of another antenna port carried on another symbol, the two antenna ports are a same antenna port. In some embodiments, that the PRSs having the association relationship share a same antenna port means that antenna ports of the PRSs having the association relationship are a same antenna port. That the PRSs having the association relationship share a same antenna port may alternatively be understood as: channels of the PRSs having the association relationship are the same, phases of the PRSs having the association relationship are continuous, or phases of the PRSs having the association relationship are the same.

In a possible implementation, in a process in which the terminal device measures the PRSs having the association relationship, the phase difference between the PRSs having the association relationship is a fixed value. For example, it is assumed that the PRS 11, the PRS 31, and the PRS 51 have an association relationship. In the process in which the terminal device measures the PRSs having the association relationship, a phase difference between the PRS 11 and the PRS 31 is a fixed value 1, a phase difference between the PRS 11 and the PRS 51 is a fixed value 2, and a phase difference between the PRS 31 and the PRS 51 is a fixed value 3. The fixed value 1, the fixed value 2, and the fixed value 3 can be the same or different. In the process in which the terminal device measures the PRSs having the association relationship, the phase difference between the PRSs having the association relationship is a fixed value. This helps the terminal device accurately estimate the phase difference between the PRSs having the association relationship.

Optionally, in the process in which the terminal device measures the PRSs having the association relationship, a small change of the phase difference between the PRSs having the association relationship may alternatively be understood as that in the process in which the terminal device measures the PRSs having the association relationship, the phase difference between the PRSs having the association relationship is a fixed value.

In a possible implementation, the first configuration information and the second configuration information further indicate that the PRSs having the association relationship share a same antenna port or the PRSs having the association relationship have a phase difference. For example, a protocol may specify that there are the following two association types: the PRSs having the association relationship share a same antenna port and the PRSs having the association relationship have a phase difference. The network device may select one association type from the two association types based on a requirement, and indicate the selected association type to the positioning management device by using the first configuration information. The positioning management device indicates the selected association type to the terminal device by using the second configuration information. After receiving the second configuration information, the terminal device measures, by using a measurement method corresponding to the association type indicated by the second configuration information, the PRSs having the association relationship. Based on this possible implementation, a network side can flexibly configure a type of the association relationship for the terminal device.

Optionally, the type of the association relationship may not be indicated by using the first configuration information and the second configuration information, and the protocol may directly specify an association type. For example, the protocol may directly specify that PRS resources having an association relationship share a same antenna port, the protocol may directly specify that PRS resources having an association relationship have a fixed phase difference, or the protocol may directly specify that PRS resources having an association relationship have a QCL relationship.

404: The terminal device measures the PRSs having the association relationship.

In some embodiments, after receiving the second configuration information sent by the positioning management device, the terminal device measures the PRSs having the association relationship. The terminal device may perform joint measurement on the PRSs having the association relationship.

In some embodiments, after receiving the second configuration information, the terminal device measures the PRSs having the association relationship.

For example, it is assumed that the PRS 11, the PRS 31, and the PRS 51 have an association relationship. If the PRSs having the association relationship share a same antenna port, the PRS 11, the PRS 31, and the PRS 51 pass through a completely same channel, and the terminal device simultaneously measures the channel through which the PRS 11, the PRS 31, and the PRS 51 pass. It may be equivalently considered as that the network device sends a new PRS whose bandwidth is equivalent to a sum of bandwidth of the PRS 11, the PRS 31, and the PRS 51, and the terminal device also receives the new PRS, and this is equivalent to increasing signal bandwidth. Because positioning precision depends on the signal bandwidth to a large extent, the positioning precision can be improved.

For another example, the PRS 11, the PRS 31, and the PRS 51 have an association relationship. If the PRSs having the association relationship have a phase difference, that is, channels through which the PRS 11, the PRS 31, and the PRS 51 pass are the same but a phase difference exists. In this way, the terminal device may estimate the phase difference, and then compensate for a channel phase of some PRSs in the PRS 11, the PRS 31, and the PRS 51 based on the phase difference, so that the channels of the PRS 11, the PRS 31, and the PRS 51 may have a same phase and thus the PRS 11, the PRS 31, and the PRS 51 share a same antenna port. According to the foregoing analysis, enabling the PRS 11, the PRS 31, and the PRS 51 to share a same antenna port is equivalent to increasing the signal bandwidth. Because the positioning precision depends on the signal bandwidth to a large extent, the positioning precision can be improved. In addition, even if the terminal device cannot estimate the phase difference and does not perform compensation based on the phase difference, the terminal can still combine measurement results of channels of the PRS 11, the PRS 31, and the PRS 51, to obtain a frequency diversity gain and improve positioning precision, but cannot obtain an equivalent large bandwidth gain.

It can be learned that, based on the method described in FIG. 4, the network side can configure, for the terminal device, specific PRSs sharing a same antenna port or specific PRSs having a phase difference. A plurality of PRSs share a same antenna port. This indicates that the plurality of PRSs pass through a completely same channel. It can be equivalently considered as that the network device sends a new PRS. Bandwidth of the new PRS is equivalent to a sum of bandwidth of the plurality of PRSs. Therefore, enabling the plurality of PRSs to share a same antenna port can increase signal bandwidth. Therefore, by configuring, for the terminal device, the specific PRSs sharing a same antenna port, large-bandwidth PRS configuration can be implemented. By configuring, for the terminal device, the specific PRSs having a phase difference, the terminal device may estimate the phase difference between these PRSs, and then compensate for a channel phase of the PRS based on the phase difference, so that the plurality of PRSs share a same antenna port, to increase signal bandwidth. Therefore, by configuring, for the terminal device, the specific PRSs having a phase difference, the large-bandwidth PRS configuration can also be implemented.

In a possible implementation, that the PRSs having the association relationship share a same antenna port or the PRSs having the association relationship have a phase difference may alternatively be replaced with that the PRSs having the association relationship have a QCL relationship. That the PRSs having the association relationship have a QCL relationship means that: the PRSs having the association relationship have one or more same or similar communication features, and a same or similar communication configuration may be used for a plurality of PRSs having the QCL relationship. The PRSs having the association relationship have a same large-scale property. The large-scale property may include a delay spread, an average delay, a Doppler spread, a Doppler shift, an average gain, a receive parameter, a receive beam number of the terminal, a transmit/receive channel correlation, an angle of arrival for reception, a spatial correlation of a receiver antenna, a dominant angle of arrival (AoA), an average angle of arrival, an AoA spread, and the like.

For example, the PRS 11, the PRS 31, and the PRS 51 have an association relationship. If the PRSs having the association relationship have a QCL relationship, the terminal device may measure the PRS 11 to obtain a measurement result 1, measure the PRS 31 to obtain a measurement result 2, and measure the PRS 51 to obtain a measurement result 3. Then, an average value of the measurement result 1, the measurement result 2, and the measurement result 3 is determined, and the average value is used as a final measurement result. Because the terminal device obtains the final measurement result based on measurement results of a plurality of PRSs, accuracy of the final measurement result is high, and this helps improve positioning precision.

Figure 9:
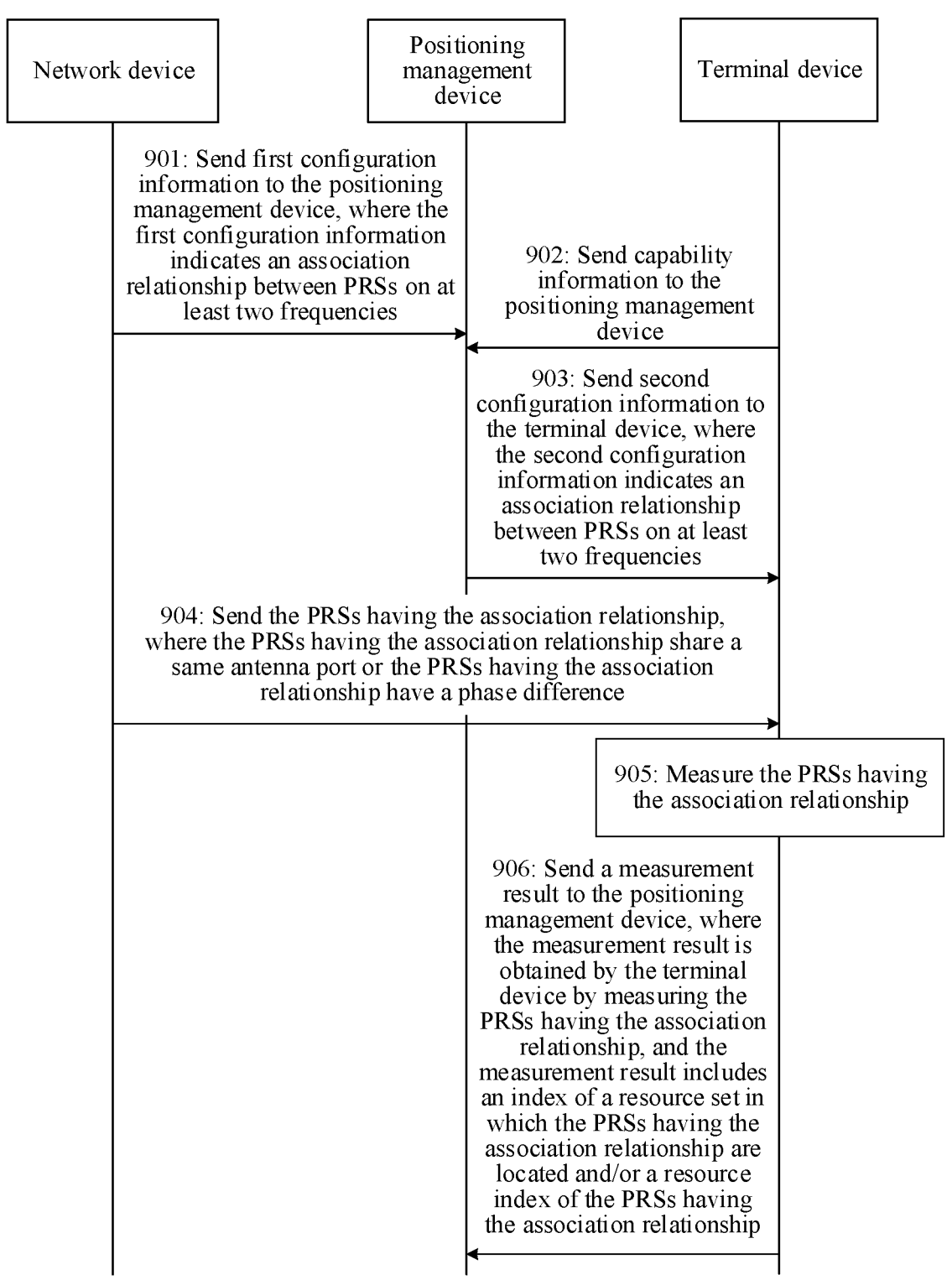
FIG. 9 is a schematic flowchart of another PRS association method according to an embodiment of this application.

FIG. 9 is a schematic flowchart of another PRS association method according to an embodiment of this application. As shown in FIG. 9, the PRS association method includes step 901 to step 906. The method shown in FIG. 9 may be performed by a terminal device, a network device, and a positioning management device, or may be performed by a chip in the terminal device, a chip in the network device, and a chip in the positioning management device. FIG. 9 is described by using an example in which the method is performed by the terminal device, the network device, and the positioning management device. Specifically:

901: The network device sends first configuration information to the positioning management device. The first configuration information indicates an association relationship between PRSs on at least two frequencies.

For an implementation of step 901, refer to the specific implementation of step 401. Details are not described herein.

902: The terminal device sends capability information to the positioning management device.

The capability information indicates one or more of the following information: maximum aggregated bandwidth supported by the terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, where the aggregated bandwidth is bandwidth of PRSs having an association relationship. The quantity of aggregated frequencies is a quantity of frequencies on which PRS resources having an association relationship are located.

For example, a PRS 11, a PRS 31, and a PRS 51 have an association relationship. A PRS 12, a PRS 32, and a PRS 52 have an association relationship. Bandwidth of the PRS 11, the PRS 31, and the PRS 51 is aggregated bandwidth 1. Bandwidth of the PRS 12, the PRS 32, and the PRS 52 is aggregated bandwidth 2. If the maximum aggregated bandwidth supported by the terminal device is 200 MHz, and it is assumed that the aggregated bandwidth 1 is 150 MHz, and the aggregated bandwidth 2 is 250 MHz, the terminal device supports that the PRS 11, the PRS 31, and the PRS 51 have an association relationship, and does not support that the PRS 12, the PRS 32, and the PRS 52 have an association relationship.

For another example, if a PRS 11 on a frequency 1 and a PRS 31 on a frequency 2 have an association relationship, a quantity of aggregated frequencies that corresponds to the association relationship is 2. If the PRS 11 on the frequency 1, the PRS 31 on the frequency 2, and a PRS 51 on a frequency 3 have an association relationship, a quantity of aggregated frequencies that corresponds to the association relationship is 3. If the maximum quantity of aggregated frequencies supported by the terminal device is 2, the terminal device supports that the PRS 11 on the frequency 1 and the PRS 31 on the frequency 2 have an association relationship, and does not support that the PRS 11 on the frequency 1, the PRS 31 on the frequency 2, and the PRS 51 on the frequency 3 have an association relationship.

For another example, the capability of performing joint processing by the terminal device on PRSs on a plurality of frequencies may be that the terminal device can jointly process N ms of PRSs on a plurality of frequencies in every T ms.

The capability information of the terminal device is reported to the positioning management device, so that the positioning management device can accurately determine, based on the capability information of the terminal device, specific PRS configurations that should be notified to the terminal device. Alternatively, the positioning management device may perform another operation based on the capability information of the terminal device.

In a possible implementation, a reporting granularity of the capability information is reporting by frequency band, reporting by frequency band group, reporting by frequency band in each frequency band group, or reporting by frequency band subset in each frequency band group. Based on this possible implementation, the capability information of the terminal device can be reported at a fine granularity.

The following separately describes in detail reporting by frequency band, reporting by frequency band group, reporting by frequency band in each frequency band group, and reporting by frequency band subset in each frequency band group.

1. Reporting by frequency band: the terminal device reports one piece of capability information for each frequency band of the terminal device. One frequency band may include one or more frequencies.

For example, the terminal device includes a frequency band 1 and a frequency band 2. The terminal device first reports capability information corresponding to the frequency band 1, and then reports capability information corresponding to the frequency band 2. The capability information corresponding to the frequency band 1 indicates one or more of the following information: maximum aggregated bandwidth supported by the terminal device in the frequency band 1, a maximum quantity of aggregated frequencies supported by the terminal device in the frequency band 1, whether the terminal device supports joint measurement on PRSs on a plurality of frequencies in the frequency band 1, or a capability of performing joint processing by the terminal device on PRSs on a plurality of frequencies in the frequency band 1.

The capability information corresponding to the frequency band 2 indicates one or more of the following information: maximum aggregated bandwidth supported by the terminal device in the frequency band 2, a maximum quantity of aggregated frequencies supported by the terminal device in the frequency band 2, whether the terminal device supports joint measurement on PRSs on a plurality of frequencies in the frequency band 2, or a capability of performing joint processing by the terminal device on PRSs on a plurality of frequencies in the frequency band 2.

2. Reporting by frequency band group: one frequency band group may include one or more frequency bands. It is assumed that the terminal device has three frequency band groups, which are respectively a frequency band group 1, a frequency band group 2, and a frequency band group 3. The frequency band group 1 includes a frequency band 1, the frequency band group 2 includes a frequency band 2, and the frequency band group 3 includes the frequency band 1+the frequency band 2. The terminal device first reports capability information corresponding to the frequency band group 1, then reports capability information corresponding to the frequency band group 2, and then reports capability information corresponding to the frequency band group 3.

The capability information corresponding to the frequency band group 1 indicates one or more of the following information: maximum aggregated bandwidth supported by the terminal device in the frequency band group 1, a maximum quantity of aggregated frequencies supported by the terminal device in the frequency band group 1, whether the terminal device supports joint measurement on PRSs on a plurality of frequencies in the frequency band group 1, or a capability of performing joint processing by the terminal device on PRSs on a plurality of frequencies in the frequency band group 1.

The capability information corresponding to the frequency band group 2 indicates one or more of the following information: maximum aggregated bandwidth supported by the terminal device in the frequency band group 2, a maximum quantity of aggregated frequencies supported by the terminal device in the frequency band group 2, whether the terminal device supports joint measurement on PRSs on a plurality of frequencies in the frequency band group 2, or a capability of performing joint processing by the terminal device on PRSs on a plurality of frequencies in the frequency band group 2.

The capability information corresponding to the frequency band group 3 indicates one or more of the following information: maximum aggregated bandwidth supported by the terminal device in the frequency band group 3, a maximum quantity of aggregated frequencies supported by the terminal device in the frequency band group 3, whether the terminal device supports joint measurement on PRSs on a plurality of frequencies in the frequency band group 3, or a capability of performing joint processing by the terminal device on PRSs on a plurality of frequencies in the frequency band group 3.

3. Reporting by frequency band in each frequency band group: It is assumed that the terminal device has three frequency band groups, which are respectively a frequency band group 1, a frequency band group 2, and a frequency band group 3. The frequency band group 1 includes a frequency band 1, the frequency band group 2 includes a frequency band 2, and the frequency band group 3 includes the frequency band 1+the frequency band 2. The terminal device first reports capability information corresponding to the frequency band 1 in the frequency band group 1, then reports capability information corresponding to the frequency band 2 in the frequency band group 2, then reports the capability information corresponding to the frequency band 1 in the frequency band group 3, and then reports the capability information corresponding to the frequency band 2 in the frequency band group 3.

4. Reporting by frequency band subset in each frequency band group: it is assumed that the terminal device has three frequency band groups, which are respectively a frequency band group 1, a frequency band group 2, and a frequency band group 3. The frequency band group 1 includes a frequency band 1, the frequency band group 2 includes a frequency band 2, and the frequency band group 3 includes the frequency band 1+the frequency band 2. The frequency band group 1 includes one frequency band subset: the frequency band 1. The frequency band group 2 includes a frequency band subset: the frequency band 2. The frequency band group 3 includes three frequency band subsets, which are respectively the frequency band 1, the frequency band 2, and the frequency band 1+the frequency band 2.

The terminal device first reports capability information corresponding to the frequency band 1 in the frequency band group 1, then reports capability information corresponding to the frequency band 2 in the frequency band group 2, then reports the capability information corresponding to the frequency band 1 in the frequency band group 3, then reports the capability information corresponding to the frequency band 2 in the frequency band group 3, and then reports capability information corresponding to the frequency band 1+the frequency band 2 in the frequency band group 3.

903: The positioning management device sends second configuration information to the terminal device. The second configuration information indicates an association relationship between PRSs on at least two frequencies.

In a possible implementation, after receiving the capability information of the terminal device, the positioning management device sends the second configuration information to the terminal device based on the capability information of the terminal device and the first configuration information.

For example, it is assumed that the terminal device reports the capability information in a manner of reporting by frequency band. The terminal device first reports the capability information corresponding to the frequency band 1, and then reports the capability information corresponding to the frequency band 2. The capability information corresponding to the frequency band 1 indicates that the maximum aggregated bandwidth supported by the terminal device in the frequency band 1 is 200 MHz, and the maximum quantity of aggregated frequencies supported by the terminal device in the frequency band 1 is 2. The capability information corresponding to the frequency band 2 indicates that the maximum aggregated bandwidth supported by the terminal device in the frequency band 2 is 400 MHz, and the maximum quantity of aggregated frequencies supported by the terminal device in the frequency band 2 is 4.

The first configuration information indicates that a PRS 1 on the frequency 1, a PRS 2 on the frequency 2, and a PRS 3 on the frequency 3 have an association relationship, and a PRS 4 on a frequency 4, a PRS 5 on a frequency 5, and a PRS 6 on a frequency 6 have an association relationship. The frequency 1, the frequency 2, and the frequency 3 are frequencies in the frequency band 1. The frequency 4, the frequency 5, and the frequency 6 are frequencies in the frequency band 2.

Bandwidth of the PRS 1, the PRS 2, and the PRS 3 is 300 MHz, and a quantity of frequencies on which the PRS 1, the PRS 2, and the PRS 3 are located is 3. The maximum aggregated bandwidth supported by the terminal device in the frequency band 1 is 200 MHz, and the maximum quantity of aggregated frequencies supported by the terminal device in the frequency band 1 is 2. Therefore, the terminal device does not support that the PRS 1, the PRS 2, and the PRS 3 have an association relationship. The second configuration information does not need to indicate that the PRS 1, the PRS 2, and the PRS 3 have an association relationship.

Bandwidth of the PRS 4, the PRS 5, and the PRS 6 is 300 MHz, and a quantity of frequencies on which the PRS 4, the PRS 5, and the PRS 6 are located is 3. The maximum aggregated bandwidth supported by the terminal device in the frequency band 2 is 400 MHz, and the maximum quantity of aggregated frequencies supported by the terminal device in the frequency band 2 is 4. Therefore, the terminal device supports that the PRS 4, the PRS 5, and the PRS 6 have an association relationship. The second configuration information needs to indicate the PRS 4, the PRS 5, and the PRS 6 have an association relationship.

904: The network device sends the PRSs having the association relationship. The PRSs having the association relationship share a same antenna port or the PRSs having the association relationship have a phase difference.

905: The terminal device measures the PRSs having the association relationship.

For related descriptions of step 904 and step 905, refer to the related descriptions of step 403 and step 404. Details are not described herein again. Optionally, that the terminal device measures the PRSs having the association relationship throughout embodiments of this application may alternatively be replaced with that the terminal device receives the PRSs having the association relationship.

In a possible implementation, an implementation in which the terminal device measures the PRSs having the association relationship is: when the PRSs having the association relationship meet a first condition, the terminal device measures the PRSs having the association relationship, where the first condition includes any one or more of the following conditions:

the PRSs having the association relationship have a same subcarrier spacing;

the PRSs having the association relationship have a same cyclic prefix type;

the PRSs having the association relationship occupy a same symbol, the PRSs having the association relationship overlap in time domain, or the PRSs having the association relationship partially overlap in time domain;

total bandwidth of the PRSs having the association relationship is less than the maximum aggregated bandwidth supported by the terminal device; or a quantity of frequencies on which the PRSs having the association relationship are located is less than a maximum quantity of associated frequencies supported by the terminal device.

For example, it is assumed that the PRS 1 on the frequency 1, the PRS 2 on the frequency 2, and the PRS 3 on the frequency 3 have an association relationship. The frequency 1, the frequency 2, and the frequency 3 are frequencies in the frequency band 1. If a subcarrier spacing of the PRS 1, a subcarrier spacing of the PRS 2, and a subcarrier spacing of the PRS 3 are all the same, a cyclic prefix type of the PRS 1, a cyclic prefix type of the PRS 2, and a cyclic prefix type of the PRS 3 are all the same, a symbol of the PRS 1, a symbol of the PRS 2, and a symbol of the PRS 3 are the same, bandwidth of the PRS 1, the PRS 2, and the PRS 3 is less than the maximum aggregated bandwidth supported by the terminal device in the frequency band 1, and a quantity of frequencies on which the PRS 1, the PRS 2, and the PRS 3 are located is less than the maximum quantity of associated frequencies supported by the terminal device in the frequency band 1, the terminal device performs joint measurement on the PRS 1, the PRS 2, and the PRS 3.

When the PRSs having the association relationship have a same subcarrier spacing, have a same cyclic prefix type, occupy a same symbol, or partially overlap in time domain, it can be more convenient for the terminal device to perform joint measurement on the PRSs having the association relationship.

It is possible that the positioning management device determines a PRS configuration in the second configuration information based on capability information of a plurality of terminal devices, and then broadcasts the second configuration information to the plurality of terminal devices. In this case, for a terminal device, total bandwidth of PRSs having an association relationship may be greater than maximum aggregated bandwidth supported by the terminal device, or a quantity of frequencies on which the PRSs having an association relationship are located is greater than a maximum quantity of associated frequencies supported by the terminal device. Therefore, before joint measurement is performed on the PRSs having the association relationship, it may be determined whether the total bandwidth of the PRSs having the association relationship is less than the maximum aggregated bandwidth supported by the terminal device, or whether the quantity of frequencies on which the PRSs having the association relationship are located is less than the maximum quantity of associated frequencies supported by the terminal device. PRS joint measurement is performed on the PRSs having the association relationship only when the total bandwidth of the PRSs having the association relationship is less than the maximum aggregated bandwidth supported by the terminal device, or the quantity of frequencies on which the PRSs having the association relationship are located is less than the maximum quantity of associated frequencies supported by the terminal device. This can ensure that the terminal device successfully performs joint measurement on the PRSs having the association relationship.

Optionally, if the total bandwidth of the PRSs having the association relationship is greater than the maximum aggregated bandwidth supported by the terminal device, or the quantity of frequencies on which the PRSs having the association relationship are located is greater than the maximum quantity of associated frequencies supported by the terminal device, the terminal device determines, from the PRSs having the association relationship, a PRS combination of maximum bandwidth supported by a terminal device capability. The terminal device measures a signal on the PRS combination. Based on this possible implementation, even if the total bandwidth of the PRSs having the association relationship is greater than the maximum aggregated bandwidth supported by the terminal device, or the quantity of frequencies on which the PRSs having the association relationship are located is greater than the maximum quantity of associated frequencies supported by the terminal device, the terminal device can also perform the joint measurement on PRSs on a plurality of frequencies.

For example, bandwidth of the PRS 1, the PRS 2, and the PRS 3 is 300 MHz. The maximum aggregated bandwidth supported by the terminal device in the frequency band 1 is 200 MHz. Therefore, the bandwidth of the PRS 1, the PRS 2, and the PRS 3 is greater than the maximum aggregated bandwidth supported by the terminal device in the frequency band 1. Bandwidth of the PRS 1 and the PRS 2 is 200 MHz, bandwidth of the PRS 1 and the PRS 3 is 150 MHz, and bandwidth of the PRS 2 and the PRS 3 is 150 MHz. The terminal device performs joint measurement on the PRS 1 and the PRS 2.

Certainly, the positioning management device may alternatively send specific second configuration information to each terminal device for capability information of each terminal device. An association relationship indicated by the second configuration information is supported by the terminal device. In other words, the second configuration information is not broadcast to the plurality of terminal devices, and the second configuration information received by each terminal device may be different. In this way, the terminal device does not need to determine whether the association relationship is supported by the terminal device. Alternatively, even if the positioning management device sends specific second configuration information to each terminal device for capability information of each terminal device, the terminal device may re-determine whether the association relationship indicated by the second configuration information is supported by the terminal device.

906: The terminal device sends a measurement result to the positioning management device. The measurement result is obtained by the terminal device by measuring a signal on the PRSs having the association relationship, and the measurement result includes an index of a resource set in which the PRSs having the association relationship are located and/or a resource index of the PRSs having the association relationship.

In some embodiments, after measuring the PRSs having the association relationship, the terminal device sends the measurement result to the positioning management device.

For example, a PRS 1 in a PRS resource set 1, a PRS 2 in a PRS resource set 2, and a PRS 3 in a PRS resource set 3 have an association relationship. The terminal device performs joint measurement on the PRS 1, the PRS 2, and the PRS 3 to obtain a measurement result 1. The measurement result 1 includes an index of the PRS resource set 1, a resource index of the PRS 1, an index of the PRS resource set 2, a resource index of the PRS 2, an index of the PRS resource set 3, and a resource index of the PRS 3. In this way, the positioning management device can determine specific PRSs based on which the measurement result 1 is obtained through joint measurement. Alternatively, if resource indexes of PRSs in different PRS resource sets are different, the measurement result 1 may include only the index of the PRS 1, the index of the PRS 2, and the index of the PRS 3. Alternatively, the measurement result 1 may include only the index of the PRS resource set 1, the resource index of the PRS 1, the index of the PRS resource set 2, and the index of the PRS resource set 3. The resource index of the PRS 1, the resource index of the PRS 2, and the resource index of the PRS 3 are the same. Therefore, only one of the resource indexes of the PRSs needs to be indicated.

For another example, an information element structure of the measurement result 1 may be as follows:

```
NR-DL-TDOA-SignalMeasurementInformation-r16 ::= SEQUENCE {
    dl-PRS-ReferenceInfo-r16              DL-PRS-ID-Info-r16,
    nr-DL-TDOA-MeasList-r16              NR-DL-TDOA-MeasList-r16,
    ...
}
NR-DL-TDOA-MeasList-r16 ::= SEQUENCE (SIZE(1..nrMaxTRPs-r16)) OF
NR-DL-TDOA-MeasElement-r16
    NR-DL-TDOA-MeasElement-r16 ::= SEQUENCE {
        dl-PRS-ID-r16                        INTEGER (0..255),
        nr-PhysCellID-r16                    NR-PhysCellID-r16
    OPTIONAL,
        nr-CellGlobalID-r16                  NCGI-r15
    OPTIONAL,
        nr-ARFCN-r16                         ARFCN-ValueNR-r15
    OPTIONAL,
        nr-DL-PRS-ResourceID-r16             NR-DL-PRS-ResourceID-r16
    OPTIONAL,
        nr-DL-PRS-ResourceSetID-r16             NR-DL-PRS-ResourceSetID-r16
    OPTIONAL,
        nr-TimeStamp-r16                     NR-TimeStamp-r16,
        nr-RSTD-r16                          CHOICE {
            k0-r16                               INTEGER (0..1970049),
            k1-r16                               INTEGER (0..985025),
            k2-r16                               INTEGER (0..492513),
            k3-r16                               INTEGER (0..246257),
            k4-r16                               INTEGER (0..123129),
            k5-r16                               INTEGER (0..61565),
            ...
        },
        nr-AdditionalPathList-r16            NR-AdditionalPathList-r16
    OPTIONAL,
        nr-TimingQuality-r16                 NR-TimingQuality-r16,
        nr-DL-PRS-RSRP-Result-r16            INTEGER (0..126)
    OPTIONAL,
        nr-DL-TDOA-AdditionalMeasurements-r16
                                            NR-DL-TDOA-AdditionalMeasurements-
r16
    OPTIONAL,
        ...
        [[
        additionalPRS-ResourceSetIdList-r17 SEQUENCE (SIZE (1..
nrMaxSetsPerTrp-r17)) OF
                                            NR-DL-PRS-ResourceSetID-r16
    OPTIONAL,-- Need ON
        ]]
        -- or
        [[
        associatedPRS-ResourceIdList-r17 SEQUENCE (SIZE
(1..nrMaxSetsPerTRP-r17)) OF DL-PRS-ResourceID-Info-r17
    OPTIONAL
        ]]
    }
```

For example, NR-DL-TDOA-MeasElement-r16 is the measurement result 1, the underlined NR-DL-PRS-ResourceSetID-r16 is the index of the PRS resource set 1, and the underlined NR-DL-PRS-ResourceID-r16 is the resource index of the PRS 1. The underlined additionalPRS-ResourceSetIdList-r17 includes the index of the PRS resource set 2 and the index of the PRS resource set 3. The underlined associatedPRS-ResourceIdList-r17 includes the resource index of the PRS 2 and the resource index of the PRS 3.

In another possible implementation, the terminal device may alternatively not include, in the measurement result, the index of the resource set in which the PRSs having the association relationship are located and/or the resource index of the PRSs having the association relationship. For example, if the second configuration information implicitly indicates, by configuring indexes of a plurality of PRS resource sets to be the same, that PRS resources in the plurality of PRS resource sets have an association relationship, the terminal device may not need to include, in the measurement result, the resource index of the resource set in which the PRSs having the association relationship are located and/or the resource index of the PRSs having the association relationship. For example, the measurement result 1 only needs to carry the index of the PRS resource set 1 and the resource index of the PRS 1, and after receiving the measurement result 1, the positioning management device can determine specific PRSs having an association relationship with the PRS 1, and can further determine specific PRSs based on which the measurement result 1 is obtained through joint measurement.

In a possible implementation, the positioning management device may determine a reporting delay of the measurement result, and indicate, at proper time based on the reporting delay of the measurement result, the terminal device to report the measurement result. The reporting delay of the measurement result refers to total processing time needed by the terminal device from performing joint measurement on the PRSs having the association relationship to obtaining the measurement result.

For example, the PRS 1 is a PRS on the frequency 1, the PRS 2 is a PRS on the frequency 2, and the PRS 3 is a PRS on the frequency 3. The PRS 1, the PRS 2, and the PRS 3 have an association relationship. It is assumed that the terminal device can jointly process 4 ms of PRSs on a plurality of frequencies in every 160 ms. 8 ms in total is needed by the terminal device to perform processing on PRS 1, PRS 2, and PRS 3, and therefore, the positioning management device determines that the total processing time needed by the terminal device from performing joint measurement on the PRS 1, the PRS 2, and the PRS 3 to obtaining the measurement result is 160 ms*2=320 ms. That is, the positioning management device determines that the reporting delay of the measurement result 1 is 320 ms. The positioning management device may indicate to the terminal device to report the measurement result after 320 ms.

Optionally, the terminal device may alternatively calculate the reporting delay of the measurement result, and report the measurement result to the positioning management device based on the reporting delay of the measurement result.

Figure 10:
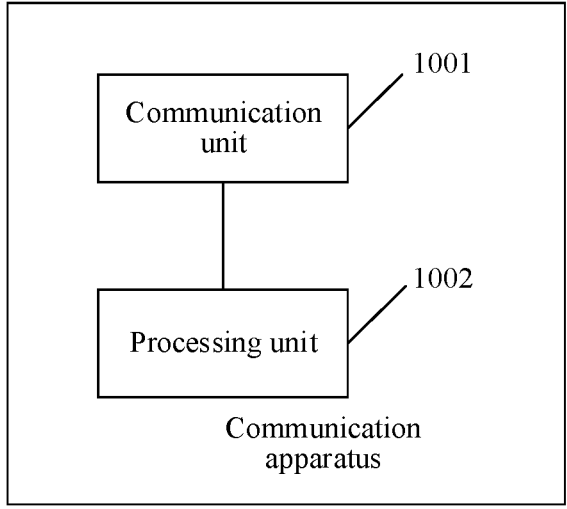
FIG. 10 is a schematic diagram of a structure of a communication apparatus according to an embodiment of this application.

FIG. 10 is a schematic diagram of a structure of a communication apparatus according to an embodiment of this application. The communication apparatus shown in FIG. 10 may be configured to implement some or all functions of the terminal device in the foregoing PRS association method. The apparatus may be a terminal device, an apparatus in the terminal device, or an apparatus that can be used cooperatively with the terminal device. The communication apparatus may alternatively be a chip system. The communication apparatus shown in FIG. 10 may include a communication unit 1001 (e.g., communication circuit) and a processing unit 1002 (e.g., processing circuit). The processing unit 1002 is configured to process data. A receiving unit (e.g., receiving sub-circuit) and a sending unit (e.g., sending sub-circuit) are integrated into the communication unit 1001. The communication unit 1001 may also be referred to as a transceiver unit (e.g., transceiver circuit). Alternatively, the communication unit 1001 may be split into a receiving unit and a sending unit. The processing unit 1002 below is similar to the communication unit 1001, and details are not described herein again.

The communication unit 1001 is configured to receive second configuration information sent by a positioning management device. The second configuration information indicates an association relationship between PRSs on at least two frequencies. The communication unit 1001 is further configured to measure the PRSs having the association relationship. The PRSs having the association relationship share a same antenna port or the PRSs having the association relationship have a phase difference.

In a possible implementation, the second configuration information further indicates that the PRSs having the association relationship share a same antenna port or the PRSs having the association relationship have a phase difference.

In a possible implementation, in a process in which the terminal device measures the PRSs having the association relationship, the phase difference between the PRSs having the association relationship is a fixed value.

In a possible implementation, a manner in which the second configuration information indicates the association relationship between the PRSs on the at least two frequencies is: the second configuration information indicates an association relationship between PRS resources on the at least two frequencies.

In a possible implementation, the second configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and configuration information of a third PRS resource set further includes an index of at least one fourth PRS resource set, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information; an index of a third PRS resource set and an index of at least one fourth PRS resource set are configured to be the same, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information; or configuration information of a third PRS resource further includes at least one piece of second index information, the second index information includes an index of a fourth PRS resource set and an index of a fourth PRS resource in the fourth PRS resource set, to indicate that the third PRS resource and at least one fourth PRS resource have an association relationship, where the third PRS resource and the at least one fourth PRS resource are resources on different frequencies configured in the second configuration information.

In a possible implementation, that a PRS resource included in the third PRS resource set and a PRS resource included in the at least one fourth PRS resource set have an association relationship is: a third PRS resource in the third PRS resource set and a fourth PRS resource in the at least one fourth PRS resource set have the association relationship; and the third PRS resource and the fourth PRS resource meet one or more of the following conditions: the third PRS resource and the fourth PRS resource have a same PRS resource index; the third PRS resource and the fourth PRS resource occupy a same symbol; or the third PRS resource and the fourth PRS resource have a QCL relationship.

In a possible implementation, the communication unit 1001 is further configured to send capability information to the positioning management device, where the capability information indicates one or more of the following information: maximum aggregated bandwidth supported by the terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, where the aggregated bandwidth is bandwidth of PRSs having an association relationship.

In a possible implementation, a reporting granularity of the capability information is reporting by frequency band, reporting by frequency band group, reporting by frequency band in each frequency band group, or reporting by frequency band subset in each frequency band group.

In a possible implementation, a manner in which the communication unit 1001 measures the positioning reference signals PRSs having the association relationship is: when the PRSs having the association relationship meet a first condition, the communication unit measures the PRSs having the association relationship, where the first condition includes any one or more of the following conditions: the PRSs having the association relationship have a same subcarrier spacing; the PRSs having the association relationship have a same cyclic prefix type; the PRSs having the association relationship occupy a same symbol, the PRSs having the association relationship overlap in time domain, or the PRSs having the association relationship partially overlap in time domain; total bandwidth of the PRSs having the association relationship is less than the maximum aggregated bandwidth supported by the terminal device; or a quantity of frequencies on which the PRSs having the association relationship are located is less than a maximum quantity of associated frequencies supported by the terminal device.

In a possible implementation, the processing unit 1002 is configured to: if the total bandwidth of the PRSs having the association relationship is greater than the maximum aggregated bandwidth supported by the terminal device, or the quantity of frequencies on which the PRSs having the association relationship are located is greater than the maximum quantity of associated frequencies supported by the terminal device, determine, from the PRSs having the association relationship, a PRS combination of maximum bandwidth supported by a terminal device capability. The communication unit 1001 is further configured to measure the PRS combination.

In a possible implementation, the communication unit 1001 is further configured to send a measurement result to the positioning management device. The measurement result is obtained by the terminal device by measuring the PRSs having the association relationship, and the measurement result includes an index of a resource set in which the PRSs having the association relationship are located and/or a resource index of the PRSs having the association relationship.

FIG. 10 is a schematic diagram of a structure of a communication apparatus according to an embodiment of this application. The communication apparatus shown in FIG. 10 may be configured to implement some or all functions of the positioning management device in the foregoing PRS association method. The apparatus may be a positioning management device, may be an apparatus in the positioning management device, or may be an apparatus that can be used cooperatively with the positioning management device. The communication apparatus may alternatively be a chip system. The communication apparatus shown in FIG. 10 may include a communication unit 1001 and a processing unit 1002. Specifically:

The communication unit 1001 is configured to receive first configuration information sent by a network device. The first configuration information indicates an association relationship between PRSs on at least two frequencies. The communication unit 1001 is further configured to send second configuration information to a terminal device. The second configuration information indicates an association relationship between PRSs on at least two frequencies. The PRSs having the association relationship share a same antenna port or the PRSs having the association relationship have a phase difference.

In a possible implementation, the first configuration information and the second configuration information further indicate that the PRSs having the association relationship share a same antenna port or the PRSs having the association relationship have a phase difference.

In a possible implementation, in a process in which the terminal device measures the PRSs having the association relationship, the phase difference between the PRSs having the association relationship is a fixed value.

In a possible implementation, a manner in which the first configuration information indicates the association relationship between the PRSs on the at least two frequencies is specifically: the first configuration information indicates an association relationship between PRS resources on the at least two frequencies; and a manner in which the second configuration information indicates the association relationship between the PRSs on the at least two frequencies is: the second configuration information indicates an association relationship between PRS resources on the at least two frequencies.

In a possible implementation, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and configuration information of a first PRS resource set further includes an index of at least one second PRS resource set, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information; an index of a first PRS resource set and an index of at least one second PRS resource set are configured to be the same, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information; or configuration information of a first PRS resource further includes at least one piece of first index information, the first index information includes an index of a second PRS resource set and an index of a second PRS resource in the second PRS resource set, to indicate that the first PRS resource and at least one second PRS resource have an association relationship, where the first PRS resource and the at least one second PRS resource are resources on different frequencies configured in the first configuration information.

In a possible implementation, that a PRS resource included in the first PRS resource set and a PRS resource included in the at least one second PRS resource set have an association relationship is: a first PRS resource in the first PRS resource set and a second PRS resource in the at least one second PRS resource set have the association relationship; and the first PRS resource and the second PRS resource meet one or more of the following conditions: the first PRS resource and the second PRS resource have a same PRS resource index; the first PRS resource and the second PRS resource occupy a same symbol; or the first PRS resource and the second PRS resource have a QCL relationship.

In a possible implementation, the second configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and configuration information of a third PRS resource set further includes an index of at least one fourth PRS resource set, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information; an index of a third PRS resource set and an index of at least one fourth PRS resource set are configured to be the same, to indicate that a PRS resource included in the third PRS resource set and a PRS resource included in the at least one fourth PRS resource set have an association relationship, where the third PRS resource set and the at least one fourth PRS resource set are resource sets on different frequencies configured in the second configuration information; or configuration information of a third PRS resource further includes at least one piece of second index information, the second index information includes an index of a fourth PRS resource set and an index of a fourth PRS resource in the fourth PRS resource set, to indicate that the third PRS resource and at least one fourth PRS resource have an association relationship, where the third PRS resource and the at least one fourth PRS resource are resources on different frequencies configured in the second configuration information.

In a possible implementation, that a PRS resource included in the third PRS resource set and a PRS resource included in the at least one fourth PRS resource set have an association relationship is: a third PRS resource in the third PRS resource set and a fourth PRS resource in the at least one fourth PRS resource set have the association relationship; and the third PRS resource and the fourth PRS resource meet one or more of the following conditions: the third PRS resource and the fourth PRS resource have a same PRS resource index; the third PRS resource and the fourth PRS resource occupy a same symbol; or the third PRS resource and the fourth PRS resource have a QCL relationship.

In a possible implementation, the communication unit 1001 is further configured to receive capability information reported by the terminal device, where the capability information indicates one or more of the following information: maximum aggregated bandwidth supported by the terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, where the aggregated bandwidth is bandwidth of PRSs having an association relationship.

In a possible implementation, a reporting granularity of the capability information is reporting by frequency band, reporting by frequency band group, reporting by frequency band in each frequency band group, or reporting by frequency band subset in each frequency band group.

In a possible implementation, the communication unit 1001 is further configured to receive a measurement result sent by the terminal device. The measurement result is obtained by the terminal device by measuring the PRSs having the association relationship, and the measurement result includes a resource index of a resource set in which the PRSs having the association relationship are located and/or a resource index of the PRSs having the association relationship.

FIG. 10 is a schematic diagram of a structure of a communication apparatus according to an embodiment of this application. The communication apparatus shown in FIG. 10 may be configured to implement some or all functions of the network device in the foregoing PRS association method. The apparatus may be a network device, may be an apparatus in the network device, or may be an apparatus that can be used cooperatively with the network device. The communication apparatus may alternatively be a chip system. The communication apparatus shown in FIG. 10 may include a communication unit 1001 and a processing unit 1002.

The communication unit 1001 is configured to send first configuration information to a positioning management device. The first configuration information indicates an association relationship between PRSs on at least two frequencies. The communication unit 1001 is further configured to send the PRSs having the association relationship. The PRSs having the association relationship share a same antenna port or the PRSs having the association relationship have a phase difference.

In a possible implementation, the first configuration information further indicates that the PRSs having the association relationship share a same antenna port or the PRSs having the association relationship have a phase difference.

In a possible implementation, in a process in which the terminal device measures the PRSs having the association relationship, the phase difference between the PRSs having the association relationship is a fixed value.

In a possible implementation, a manner in which the first configuration information indicates the association relationship between the PRSs on the at least two frequencies is: the first configuration information indicates an association relationship between PRS resources on the at least two frequencies.

In a possible implementation, the first configuration information includes configuration information of a plurality of frequencies, the configuration information of the frequency includes an index of the frequency and configuration information of a PRS resource set on the frequency, the configuration information of the PRS resource set includes an index of the PRS resource set and configuration information of a PRS resource in the PRS resource set, and the configuration information of the PRS resource includes an index of the PRS resource; and configuration information of a first PRS resource set further includes an index of at least one second PRS resource set, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information; an index of a first PRS resource set and an index of at least one second PRS resource set are configured to be the same, to indicate that a PRS resource included in the first PRS resource set and a PRS resource included in the at least one second PRS resource set have an association relationship, where the first PRS resource set and the at least one second PRS resource set are resource sets on different frequencies configured in the first configuration information; or configuration information of a first PRS resource further includes at least one piece of first index information, the first index information includes an index of a second PRS resource set and an index of a second PRS resource in the second PRS resource set, to indicate that the first PRS resource and at least one second PRS resource have an association relationship, where the first PRS resource and the at least one second PRS resource are resources on different frequencies configured in the first configuration information.

In a possible implementation, that a PRS resource included in the first PRS resource set and a PRS resource included in the at least one second PRS resource set have an association relationship is: a first PRS resource in the first PRS resource set and a second PRS resource in the at least one second PRS resource set have the association relationship; and the first PRS resource and the second PRS resource meet one or more of the following conditions: the first PRS resource and the second PRS resource have a same PRS resource index; the first PRS resource and the second PRS resource occupy a same symbol; or the first PRS resource and the second PRS resource have a QCL relationship.

Figure 11A:
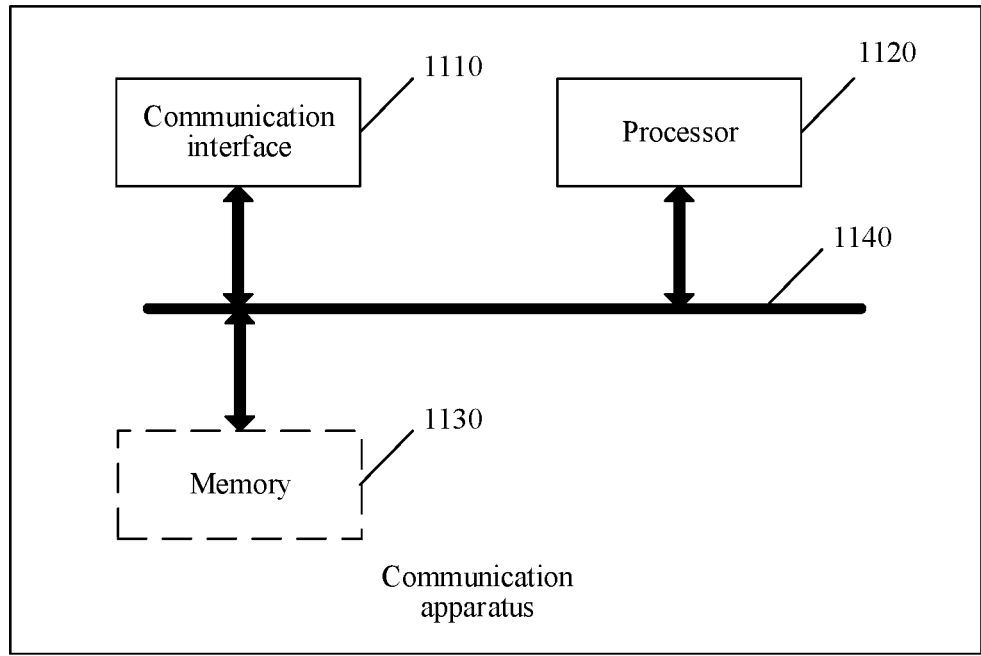
FIG. 11a is a schematic diagram of a structure of another communication apparatus according to an embodiment of this application.

FIG. 11a shows a communication apparatus 110 according to an embodiment of this application. The communication apparatus 110 is configured to implement a function of the terminal device in FIG. 4, or FIG. 9. The apparatus may be a terminal device or an apparatus used in the terminal device. The apparatus used in the terminal device may be a chip system or a chip in the terminal device. The chip system may include a chip, or may include a chip and another discrete device. Alternatively, the communication apparatus 110 is configured to implement a function of the positioning management device in FIG. 4 or FIG. 9. The apparatus may be a positioning management device or an apparatus used in the positioning management device. The apparatus used in the positioning management device may be a chip system or a chip in the positioning management device. Alternatively, the communication apparatus 110 is configured to implement a function of the network device in FIG. 4 or FIG. 9. The apparatus may be a network device or an apparatus used in the network device. The apparatus used in the network device may be a chip system or a chip in the network device. The chip system may include a chip, or may include a chip and another discrete device.

The communication apparatus 110 includes at least one processor 1120, configured to implement a data processing function of the terminal device, the positioning management device, or the network device in the methods provided in embodiments of this application. The apparatus 110 may further include a communication interface 1110, configured to implement receiving and sending operations of the terminal device, the positioning management device, or the network device in the methods provided in embodiments of this application. In embodiments of this application, the communication interface may be a transceiver, a circuit, a bus, a module, or a communication interface of another type, and is configured to communicate with another device by using a transmission medium. For example, the communication interface 1110 is used by an apparatus in the apparatus 110 to communicate with the another device. The processor 1120 receives and sends data through the communication interface 1110, and is configured to implement the method in the foregoing method embodiment in FIG. 4 or FIG. 9.

The apparatus 110 may further include at least one memory 1130, configured to store program instructions and/or data. The memory 1130 is coupled to the processor 1120. Coupling in some embodiments is indirect coupling or a communication connection between apparatuses, units, or modules, may be in an electrical, mechanical, or another form, and is used for information exchange between the apparatuses, units, or modules. The processor 1120 may cooperate with the memory 1130. The processor 1120 may execute the program instructions stored in the memory 1130. At least one of the at least one memory may be included in the processor.

A specific connection medium between the communication interface 1110, the processor 1120, and the memory 1130 is not limited in some embodiments. In some embodiments, the memory 1130, the processor 1120, and the communication interface 1110 are connected to each other through a bus 1140 in FIG. 11a. The bus is represented by using a bold line in FIG. 11a. A connection manner between other components is merely an example for descriptions, and is not limited thereto. The bus may be classified into an address bus, a data bus, a control bus, or the like. For ease of representation, only one bold line is used to represent the bus in FIG. 11a, but this does not mean that there is only one bus or only one type of bus.

When the apparatus 110 is an apparatus used in the terminal device, the positioning management device, or the network device, for example, when the apparatus 110 is a chip or a chip system, the communication interface 1110 may output or receive a baseband signal. When the apparatus 110 is the terminal device, the positioning management device, or the network device, the communication interface 1110 may output or receive a radio frequency signal. In some embodiments, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in embodiments of this application. The general-purpose processor may be a microprocessor, any conventional processor, or the like. The operations in the methods disclosed with reference to embodiments of this application may be directly performed and completed by a hardware processor, or may be performed and completed by a combination of hardware in the processor and a software module.

Figure 11B:
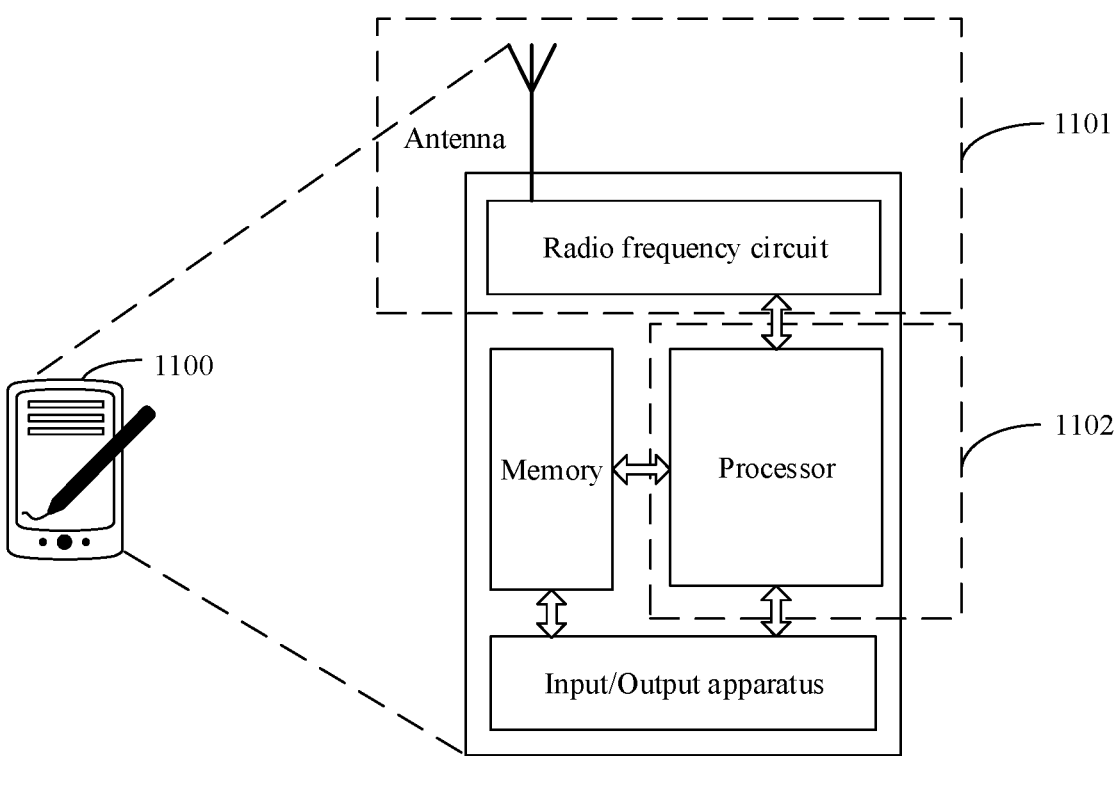
FIG. 11b is a schematic diagram of a structure of still another communication apparatus according to an embodiment of this application.

For example, FIG. 11*b* is a schematic diagram of a structure of another terminal device 1100 according to an embodiment of this application. The terminal device may perform the operations performed by the terminal device in the foregoing method embodiments.

For ease of description, FIG. 11*b* shows only main components in the terminal device. As shown in FIG. 11*b*, the terminal device 1100 includes a processor, a memory, a radio frequency circuit, an antenna, and an input/output apparatus. The processor is configured to: process a communication protocol and communication data, control the entire terminal device, execute a software program, and process data of the software program, for example, support the terminal device in performing the procedure described in FIG. 4 or FIG. 9. The memory is configured to store the software program and data. The radio frequency circuit is configured to: perform conversion between a baseband signal and a radio frequency signal, and process the radio frequency signal. The antenna is configured to receive and send a radio frequency signal in a form of an electromagnetic wave. The terminal device 1100 may further include the input/output apparatus, such as a touchscreen, a display screen, or a keyboard, and the input/output apparatus is configured to receive data entered by a user and output data to the user. It should be noted that some types of terminal devices may have no input/output apparatus.

After the terminal device is powered on, the processor may read the software program in a storage unit, interpret, and execute the data of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

Persons skilled in the art may understand that, for ease of description, FIG. 11*b* shows only one memory and only one processor. In an actual terminal device, there may be a plurality of processors and memories. The memory may also be referred to as a storage medium, a storage device, or the like. This is not limited in some embodiments.

In an optional implementation, the processor may include a baseband processor and a central processing unit (CPU). The baseband processor is configured to process a communication protocol and communication data. The CPU is configured to control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

For example, in some embodiments, as shown in FIG. 11*b*, the antenna and the radio frequency circuit that have sending and receiving functions may be considered as a communication unit 1101 of the terminal device 1100, and the processor having a processing function may be considered as a processing unit 1102 of the terminal device 1100.

The communication unit 1101 may also be referred to as a transceiver machine, a transceiver, a transceiver apparatus, a transceiver unit, or the like, and is configured to implement the sending and receiving functions. Optionally, a component that is in the communication unit 1101 and that is configured to implement the receiving function may be considered as a receiving unit, and a component that is in the communication unit 1101 and that is configured to implement the sending function may be considered as a sending unit. That is, the communication unit 1101 includes the receiving unit and the sending unit. For example, the receiving unit may also be referred to as a receiver, a receive machine, or a receiving circuit, and the sending unit may also be referred to as a transmitter, a transmit machine, or a transmitting circuit.

In some embodiments, the communication unit 1101 and the processing unit 1102 may be integrated into one component, or may be separated as different components. In addition, the processor and the memory may be integrated into one component, or may be separated as different components.

The communication unit 1101 may be configured to perform receiving and sending operations of the terminal device in the foregoing method embodiments. The processing unit 1102 may be configured to perform a data processing operation of the terminal device in the foregoing method embodiments.

An embodiment of this application further provides a computer-readable storage medium. The computer-readable storage medium stores instructions. When the instructions run on a processor, a method procedure in the foregoing method embodiment is implemented.

An embodiment of this application further provides a computer program product. When the computer program product runs on a processor, a method procedure in the foregoing method embodiment is implemented.

It should be noted that, for brief description, the foregoing method embodiments are represented as a combination of a series of actions. However, persons skilled in the art should understand that this application is not limited to the described order of the actions, because according to this application, some operations may be performed in other orders or simultaneously. It should be further appreciated by persons skilled in the art that embodiments described in this specification all belong to preferred embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease of description and brevity, for functions of the apparatuses and devices provided in embodiments of this application and operations performed by the apparatuses and devices, refer to related descriptions of the method embodiments of this application. The method embodiments and the apparatus embodiments may also be mutually referenced, combined, or cited.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

The invention claimed is:

1. A positioning reference signal (PRS) association method, performed by a terminal device or a chip in the terminal device, comprising:

receiving, from a positioning management device, second configuration information indicating an association relationship between PRS resource sets on at least two frequency points, wherein the PRS resource sets having an association relationship indicates that PRSs from different PRS resource sets have an association relationship; and when the PRSs having the association relationship meet a first condition, measuring the PRSs having the association relationship, wherein the first condition comprises one or more conditions selected from:

the PRSs having the association relationship have a same subcarrier spacing, the PRSs having the association relationship have a same cyclic prefix type, and the PRSs having the association relationship occupy a same symbol;

wherein the PRSs having the association relationship share a same antenna port or the PRSs having the association relationship have a phase difference;

wherein the PRSs having the association relationship share the same antenna port means that a channel over which a symbol on an antenna port is conveyed can be inferred from a channel over which another symbol on the same antenna port is conveyed.

2. The method according to claim 1, wherein the second configuration information further indicates that the PRSs having the association relationship share a same antenna port or the PRSs having the association relationship have a phase difference.

3. The method according to claim 2, wherein the method further comprises:

sending capability information to the positioning management device, wherein the capability information indicates one or more of the following information: maximum aggregated bandwidth supported by the terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, wherein the aggregated bandwidth is bandwidth of PRSs having an association relationship.

4. The method according to claim 3, wherein a reporting granularity of the capability information is reporting by frequency band, reporting by frequency band group, reporting by frequency band in each frequency band group, or reporting by frequency band subset in each frequency band group.

5. An apparatus comprising: at least one processor coupled to at least one memory storing instructions and configured to execute the instructions to cause the apparatus to perform:

sending first configuration information to a positioning management device, wherein the first configuration information indicates an association relationship between positioning reference signal (PRS) resource sets on at least two frequency points; the PRS resource sets having an association relationship indicates that PRSs from different PRS resource sets have an association relationship;

sending the PRSs having the association relationship, wherein the PRSs having the association relationship meet comprises one or more conditions selected from:

the PRSs having the association relationship have a same subcarrier spacing, the PRSs having the association relationship have a same cyclic prefix type, and the PRSs having the association relationship occupy a same symbol;

wherein the PRSs having the association relationship share a same antenna port or the PRSs having the association relationship have a phase difference;

wherein the PRSs having the association relationship share the same antenna port means that a channel over which a symbol on an antenna port is conveyed can be inferred from a channel over which another symbol on the same antenna port is conveyed.

6. The apparatus according to claim 5, wherein the first configuration information further indicates that the PRSs having the association relationship share a same antenna port or the PRSs having the association relationship have a phase difference.

7. An apparatus comprising: at least one processor coupled to at least one memory storing instructions and configured to execute the instructions to cause the apparatus to perform:

receiving second configuration information indicating an association relationship between PRS resource sets on at least two frequency points, wherein the PRS resource sets having an association relationship indicates that PRSs from different PRS resource sets have an association relationship; and;

when the PRSs having the association relationship meet a first condition, measuring the PRSs having the association relationship, wherein the first condition includes the following conditions:

the PRSs having the association relationship have a same subcarrier spacing, the PRSs having the association relationship have a same cyclic prefix type, and the PRSs having the association relationship occupy a same symbol;

wherein the PRSs having the association relationship share a same antenna port or the PRSs having the association relationship have a phase difference;

wherein the PRSs having the association relationship share the same antenna port means that a channel over which a symbol on an antenna port is conveyed can be inferred from a channel over which another symbol on the same antenna port is conveyed.

8. The apparatus according to claim 7, wherein the second configuration information further indicates that the PRSs having the association relationship share a same antenna port or the PRSs having the association relationship have a phase difference.

9. The apparatus according to claim 7, wherein the method further comprises:

sending capability information to the positioning management device, wherein the capability information indicates one or more of the following information: maximum aggregated bandwidth supported by a terminal device, a maximum quantity of aggregated frequencies supported by the terminal device, whether the terminal device supports joint measurement on PRSs on a plurality of frequencies, or a capability of performing joint processing by the terminal device on PRSs on a plurality of frequencies, wherein the aggregated bandwidth is bandwidth of PRSs having an association relationship.

10. The apparatus according to claim 9, wherein a reporting granularity of the capability information is reporting by frequency band, reporting by frequency band group, reporting by frequency band in each frequency band group, or reporting by frequency band subset in each frequency band group.

\* \* \* \* \*